July 11, 1939.　　　R. E. PARIS　　　2,165,298
AUTOMATICALLY CONTROLLED CALCULATING MECHANISM
Filed Feb. 28, 1929　　　33 Sheets-Sheet 5
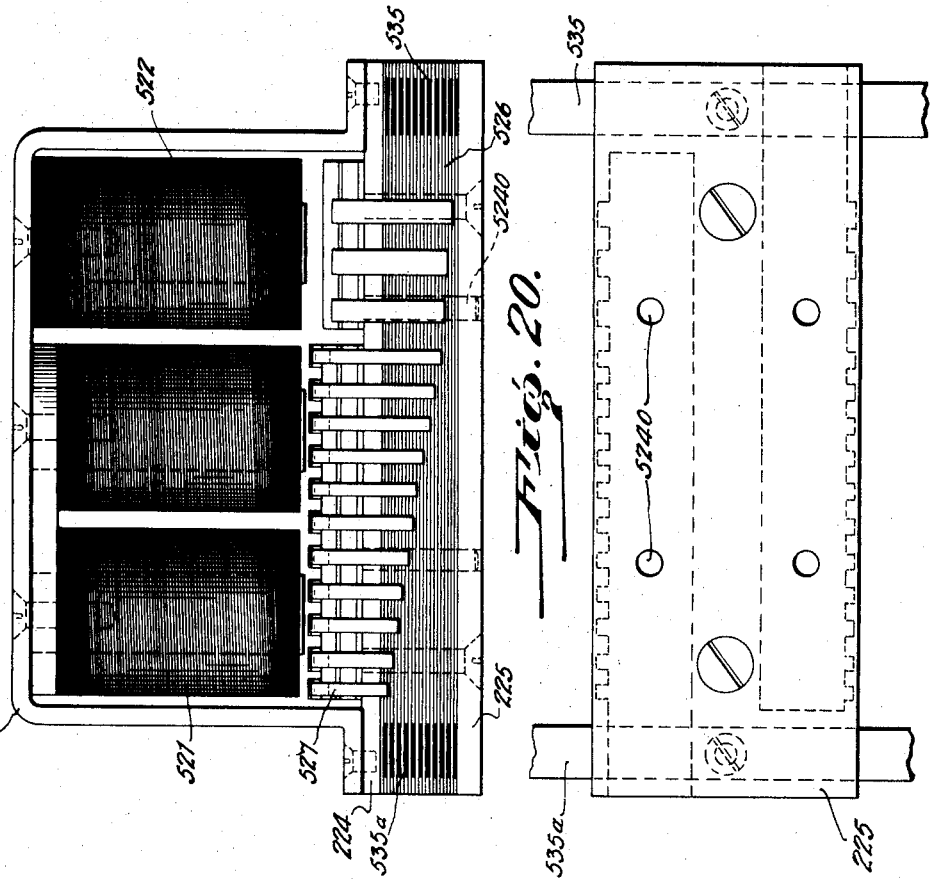
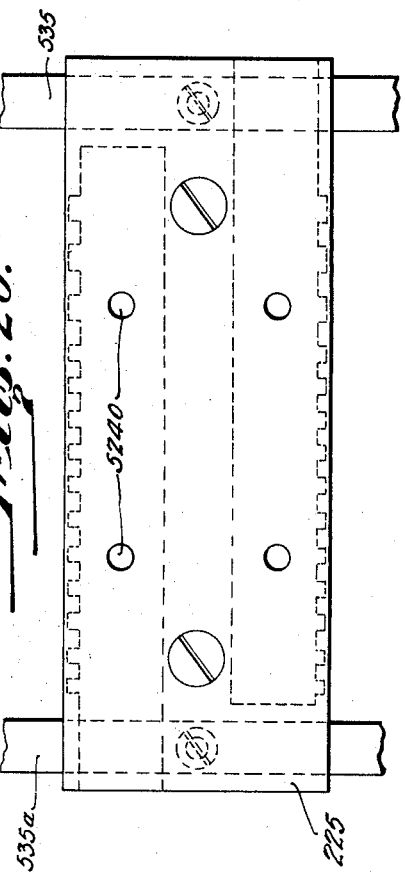
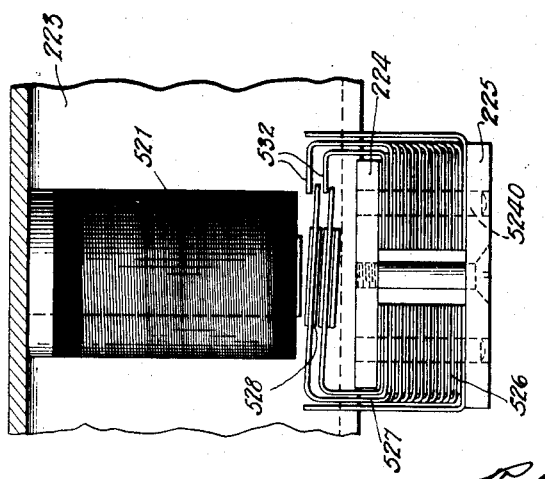
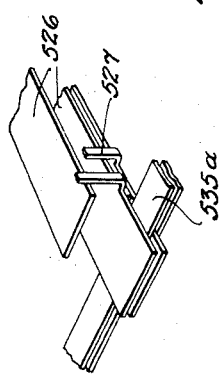
Inventor
Robert E. Paris
By his Attorney H. C. Sparks July 11, 1939.  R. E. PARIS  2,165,298
AUTOMATICALLY CONTROLLED CALCULATING MECHANISM
Filed Feb. 28, 1929  33 Sheets-Sheet 16

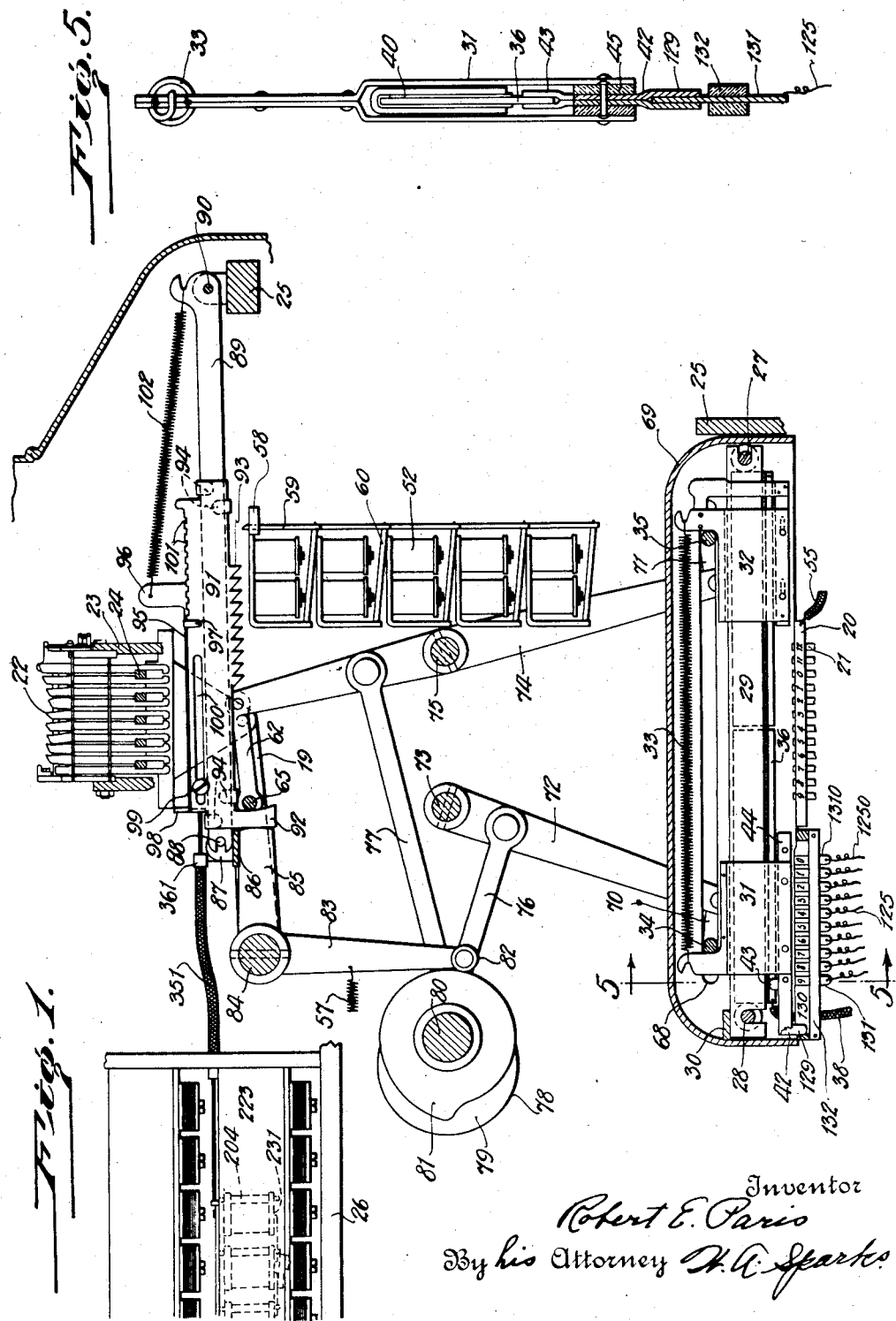
July 11, 1939.  R. E. PARIS  2,165,298
AUTOMATICALLY CONTROLLED CALCULATING MECHANISM
Filed Feb. 28, 1929  33 Sheets-Sheet 1
Inventor
Robert E. Paris
By his Attorney July 11, 1939.   R. E. PARIS   2,165,298
AUTOMATICALLY CONTROLLED CALCULATING MECHANISM
Filed Feb. 28, 1929   33 Sheets-Sheet 2
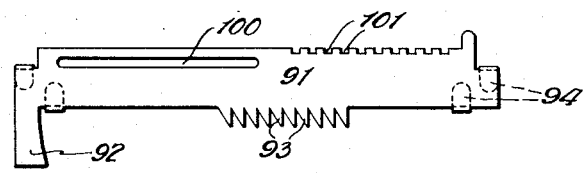
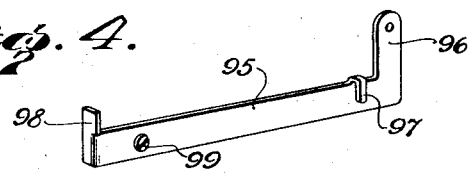
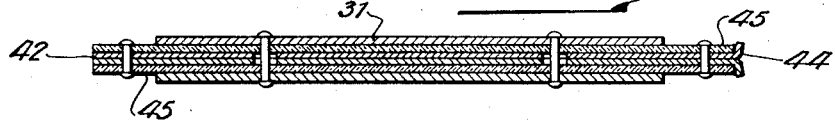
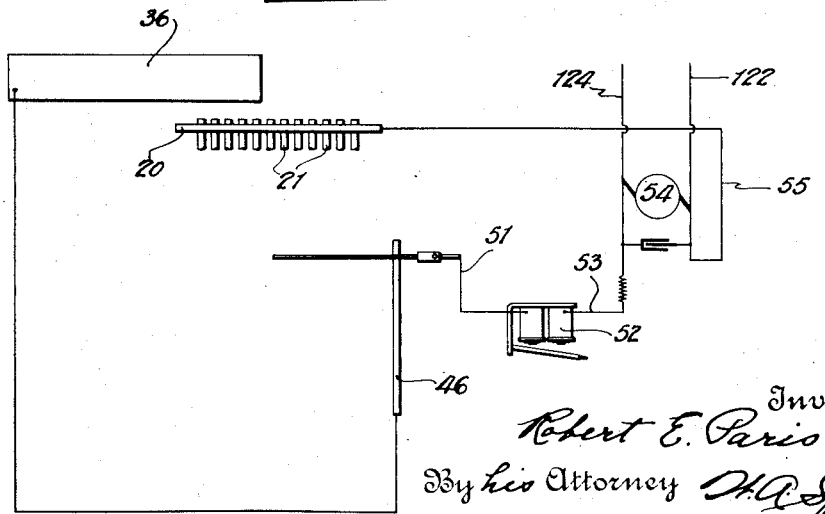
Inventor
Robert E. Paris
By his Attorney

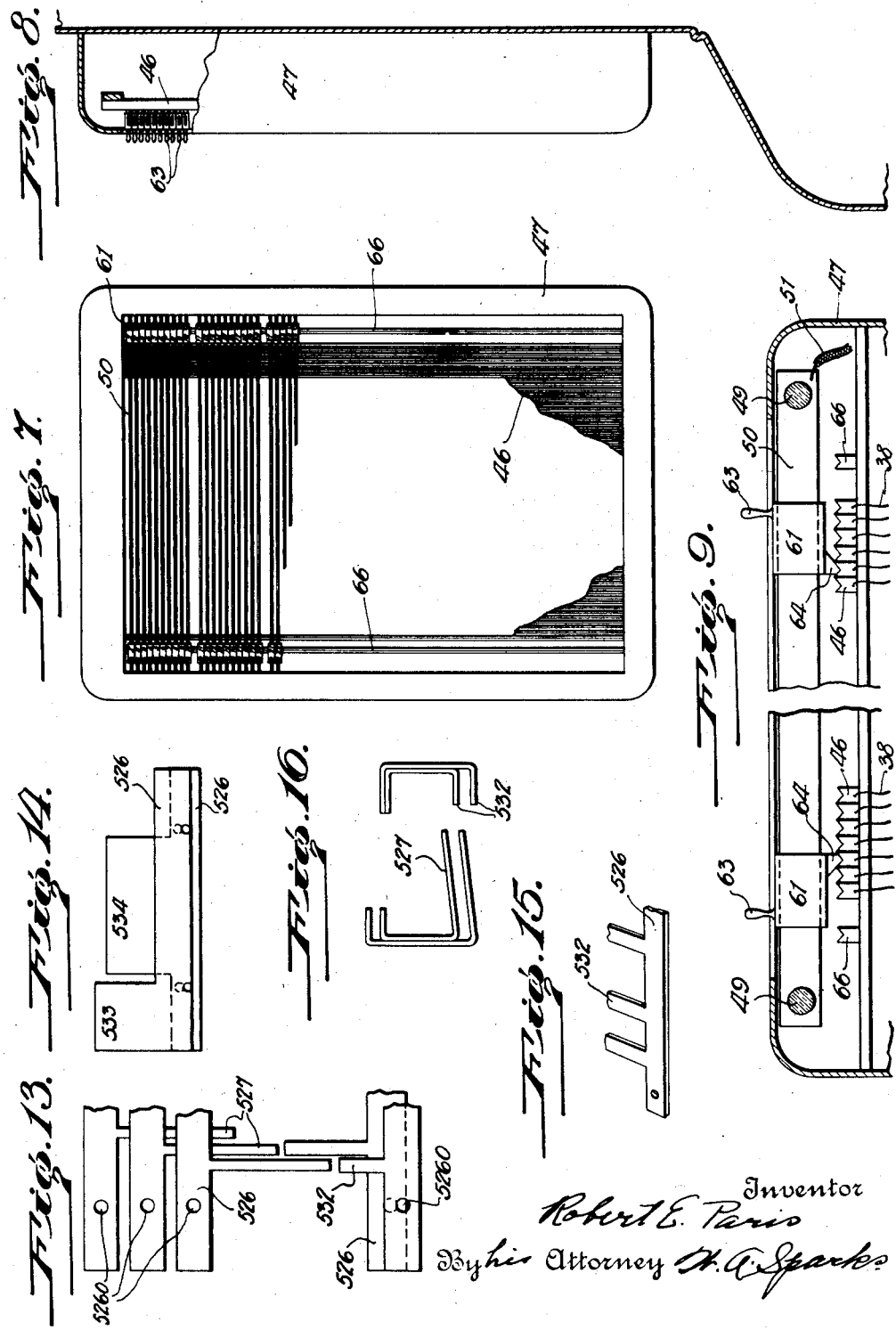

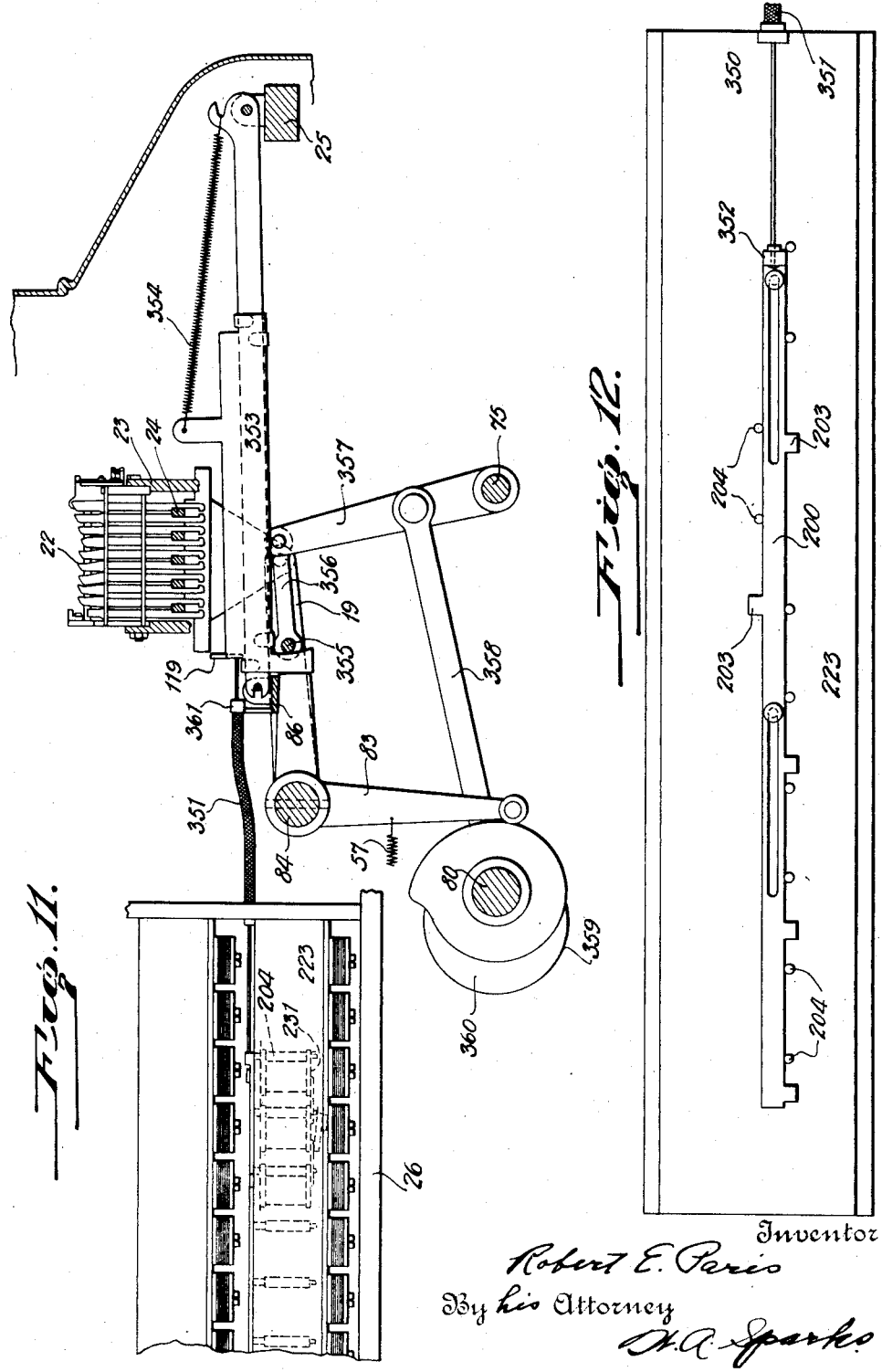

INVENTOR
Robert E. Paris
BY
ATTORNEY

July 11, 1939.　　　　R. E. PARIS　　　　2,165,298
AUTOMATICALLY CONTROLLED CALCULATING MECHANISM
Filed Feb. 28, 1929　　　33 Sheets-Sheet 23

INVENTOR
Robert E. Paris
BY
ATTORNEY

July 11, 1939.   R. E. PARIS   2,165,298
AUTOMATICALLY CONTROLLED CALCULATING MECHANISM
Filed Feb. 28, 1929   33 Sheets-Sheet 25

INVENTOR
Robert E. Paris
BY
ATTORNEY

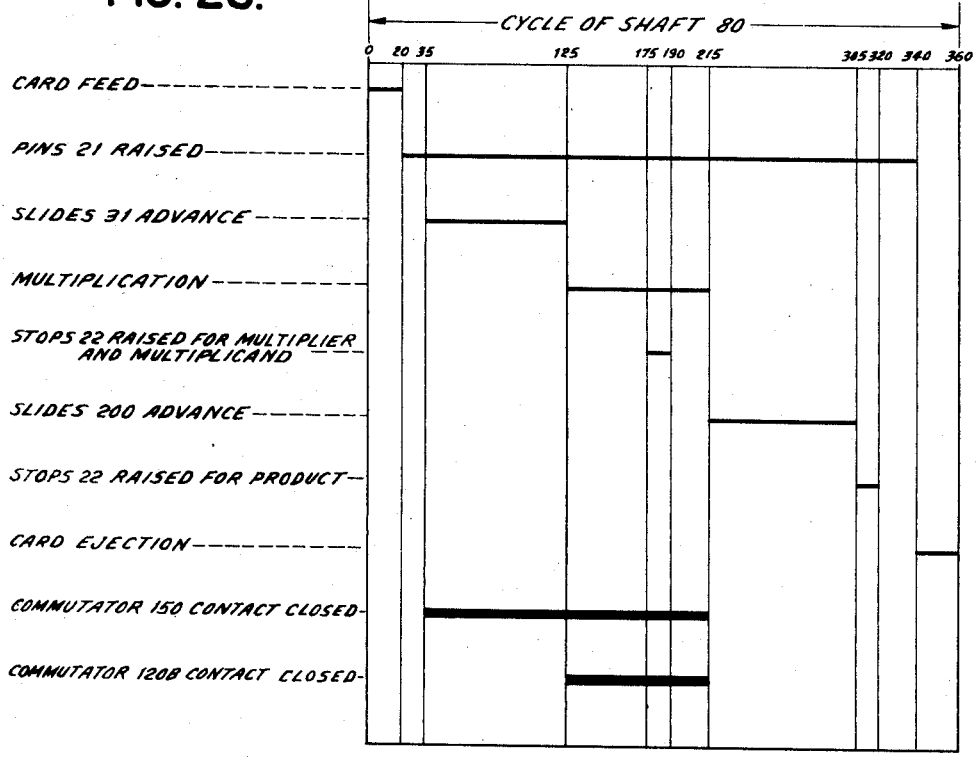

Patented July 11, 1939

2,165,298

UNITED STATES PATENT OFFICE

2,165,298

AUTOMATICALLY CONTROLLED CALCULATING MECHANISM

Robert E. Paris, New York, N. Y., assignor to International Business Machines Corporation, New York, N. Y., a corporation of New York Application February 28, 1929, Serial No. 343,277

13 Claims. (Cl. 235—61.6)

This invention relates to automatically controlled calculating mechanism, and the principal object is to provide a tabulator or card-controlled adding or printing mechanism or card perforating or other recording mechanism with means for automatically multiplying amounts and transferring the results to the recording mechanism.

The invention can be used wherever automatic or semi-automatic calculating mechanisms are required; although the embodiment here shown is especially designed for use with perforated-card machines.

Another object is to modify the construction shown in my pending application Serial Number 302,453, filed August 28, 1928, for this purpose.

With these and other objects in view the invention resides in certain novel construction and combination and arrangements of parts, the essential features of which are set forth in the accompanying drawings in which:

Fig. 1 is a fragmentary vertical sectional view of a tabulator provided with my invention, showing the means for setting up the multiplier and multiplicand and/or other data in the tabulator head.

Figs. 2, 3 and 4 are detail views of elements of one of the preliminary representation devices shown in Fig. 1.

Fig. 5 is a detail end view of one of the bars carrying slides co-operative with the pins of the pin-box.

Fig. 6 is a horizontal sectional view of one of the controlling slides.

Fig. 7 is a front view of the control or connection box.

Fig. 8 is a side view of the same.

Fig. 9 is an enlarged fragmentary horizontal section of the control box.

Fig. 10 is a diagrammatic view showing characteristic wiring for the magnets shown in Fig. 1.

Fig. 11 is a view similar to Fig. 1 showing the means for setting up the product in the tabulator head.

Fig. 12 is a top plan view of one of the denominational sections of the "lower-digit" product register.

Fig. 13 is a view showing the blanks carrying the contactors and those carrying the majority of the contacts for the calculating mechanism magnets.

Fig. 14 is a view showing typical "carry" and "no-carry" contact blanks.

Fig. 15 is a fragmentary detail view of one of the contact blanks for the multiplicand register.

Fig. 16 is a detail view showing the method of bending the contact and contactor blanks.

Fig. 17 is a detail perspective view showing the manner of connecting the contact and contactor blanks of a denomination.

Fig. 18 is an enlarged end elevation of one of the magnets and its connections.

Fig. 19 is a detail elevation of one of the adding magnets with its relay and connections.

Fig. 20 is a bottom view of the parts shown in Fig. 19.

Figure 21A:
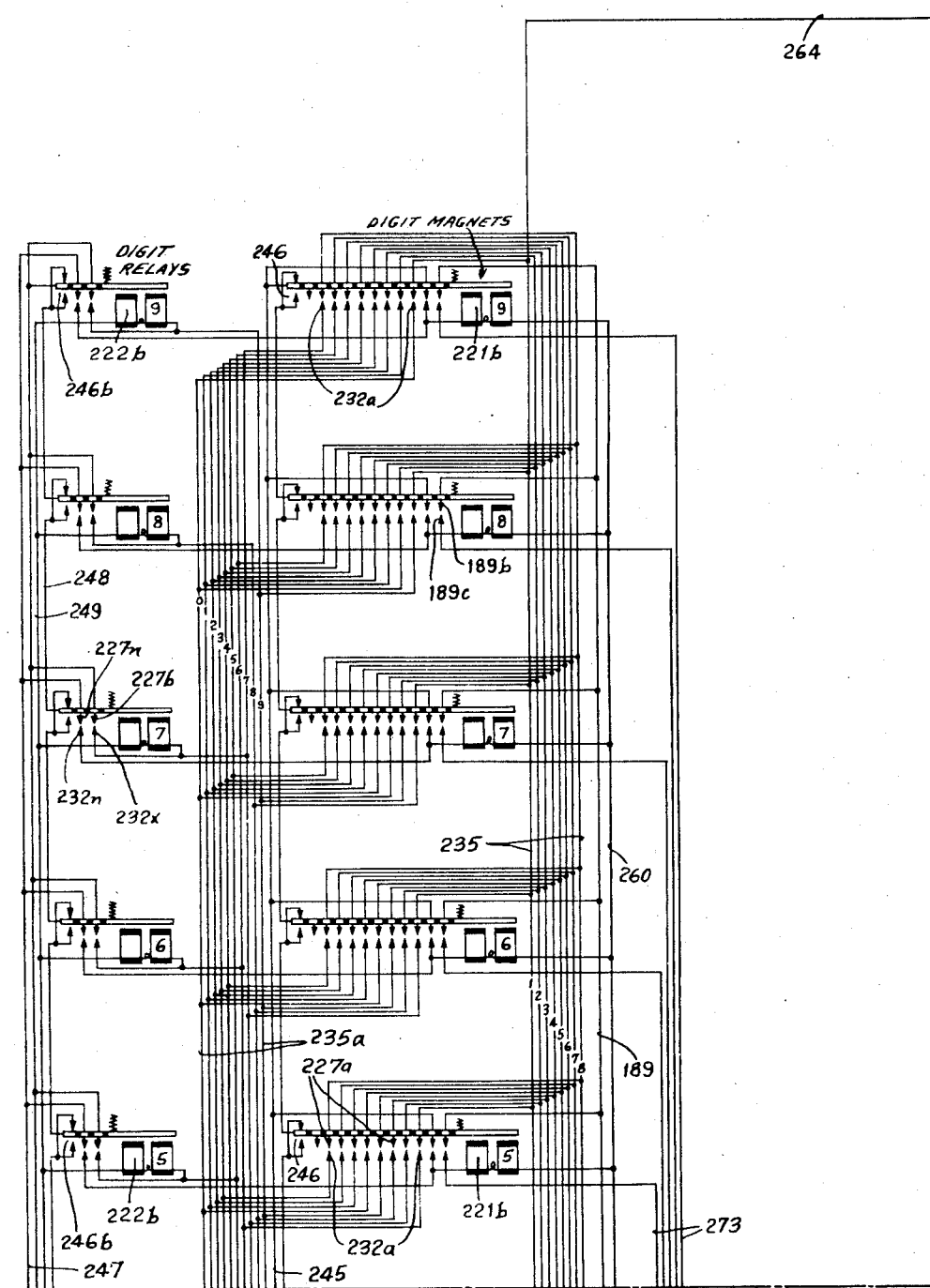
Figure 21B:
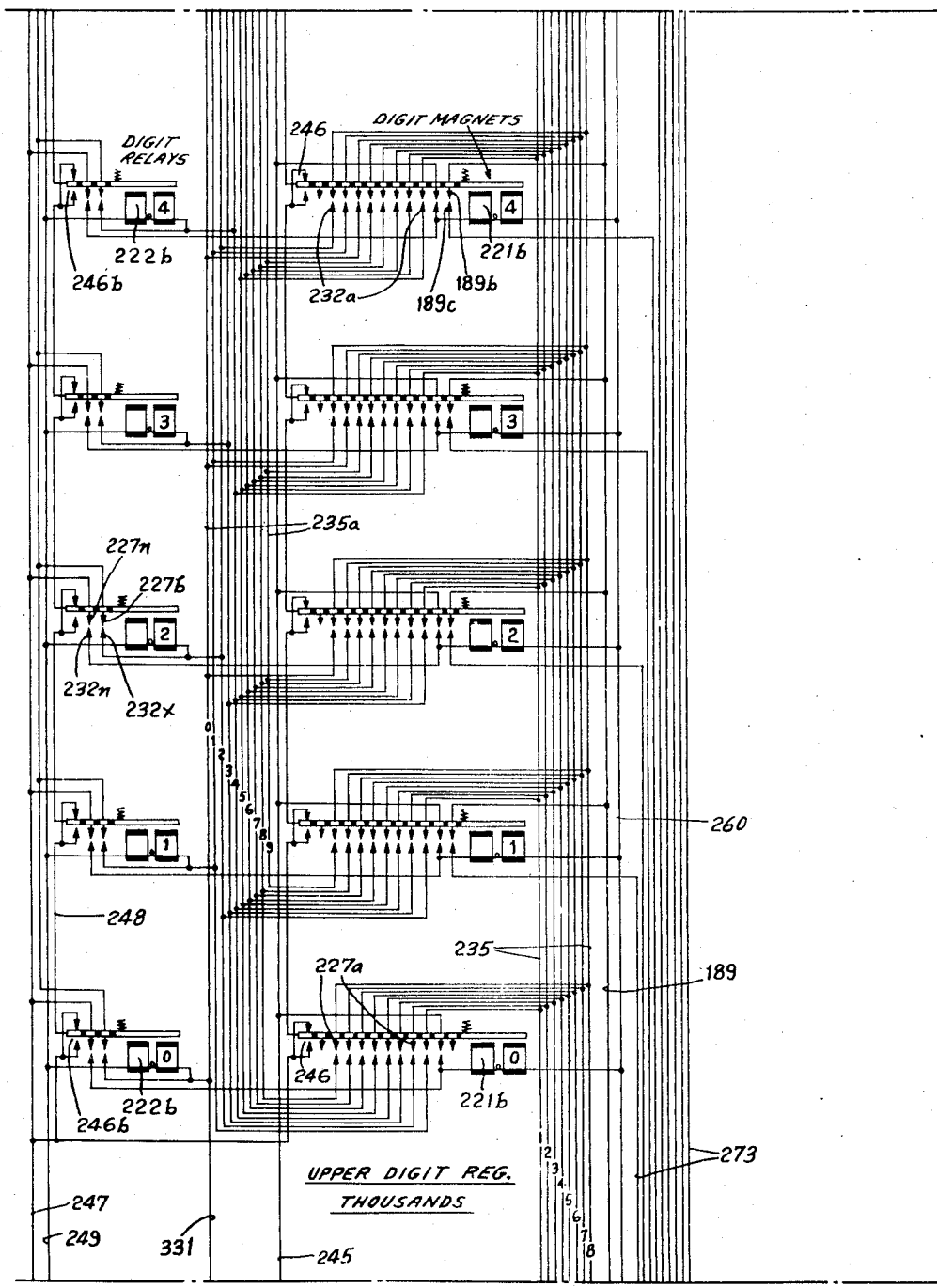
Figure 21C:
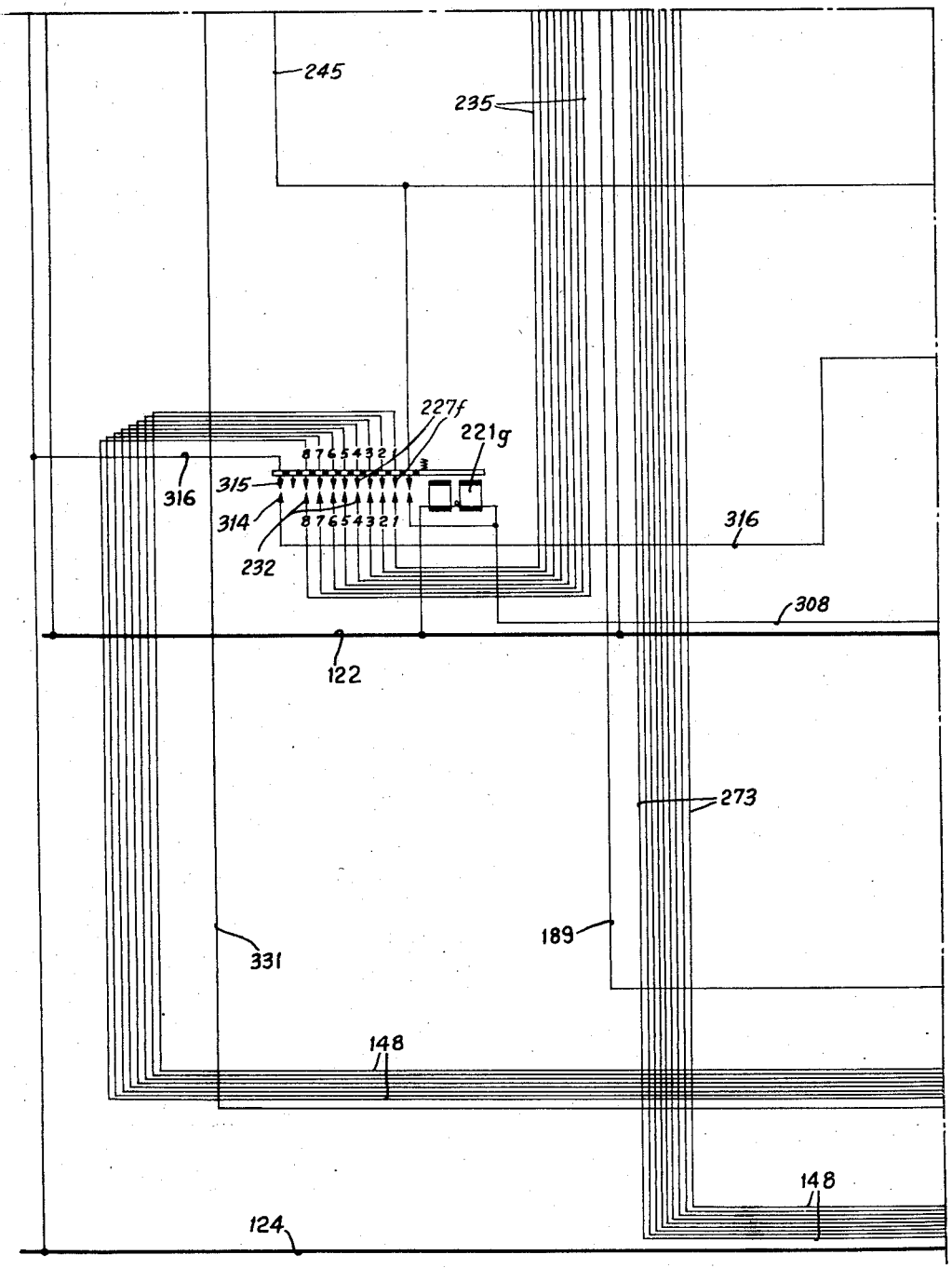
Figure 21D:
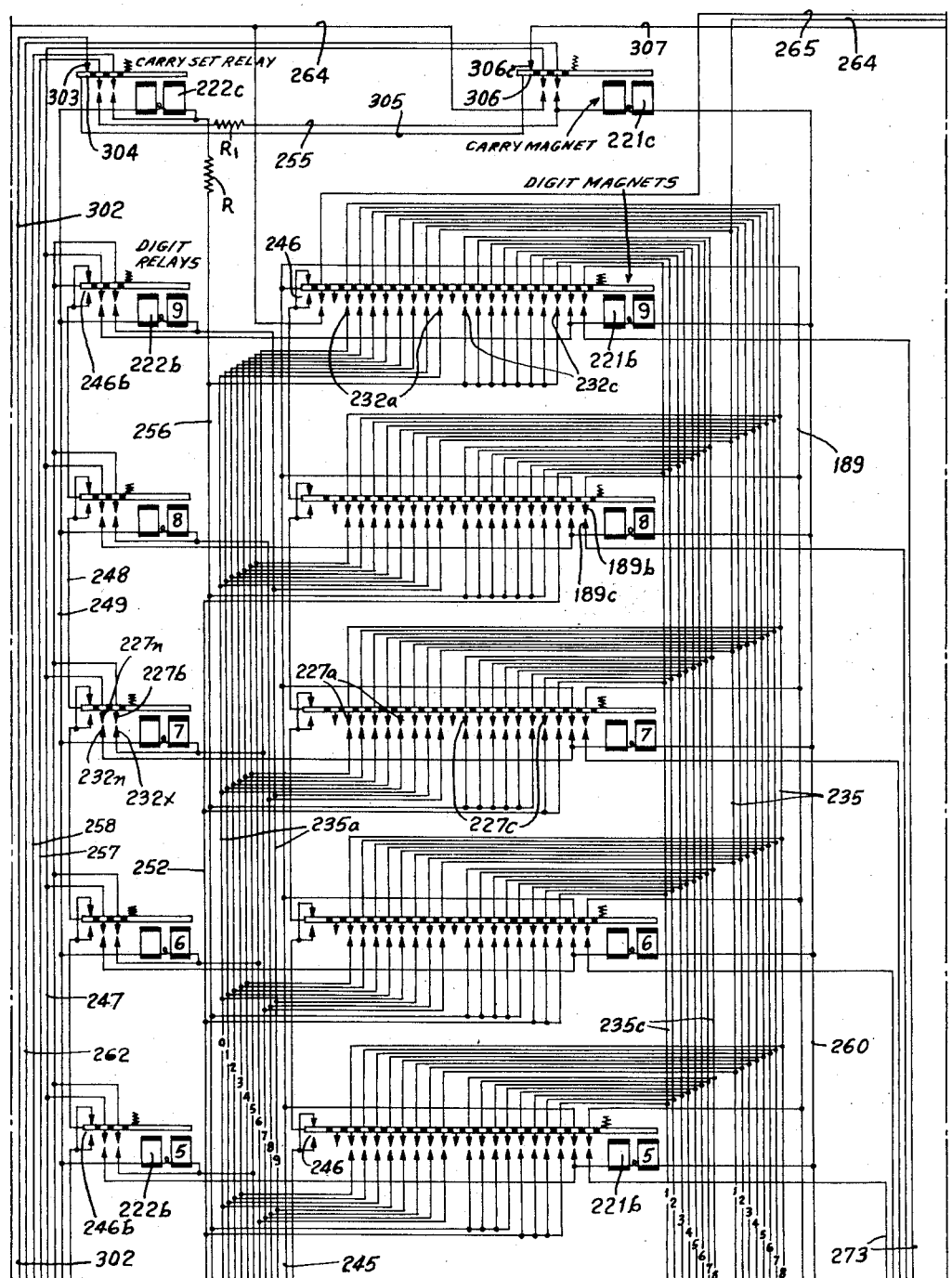
Figure 21E:
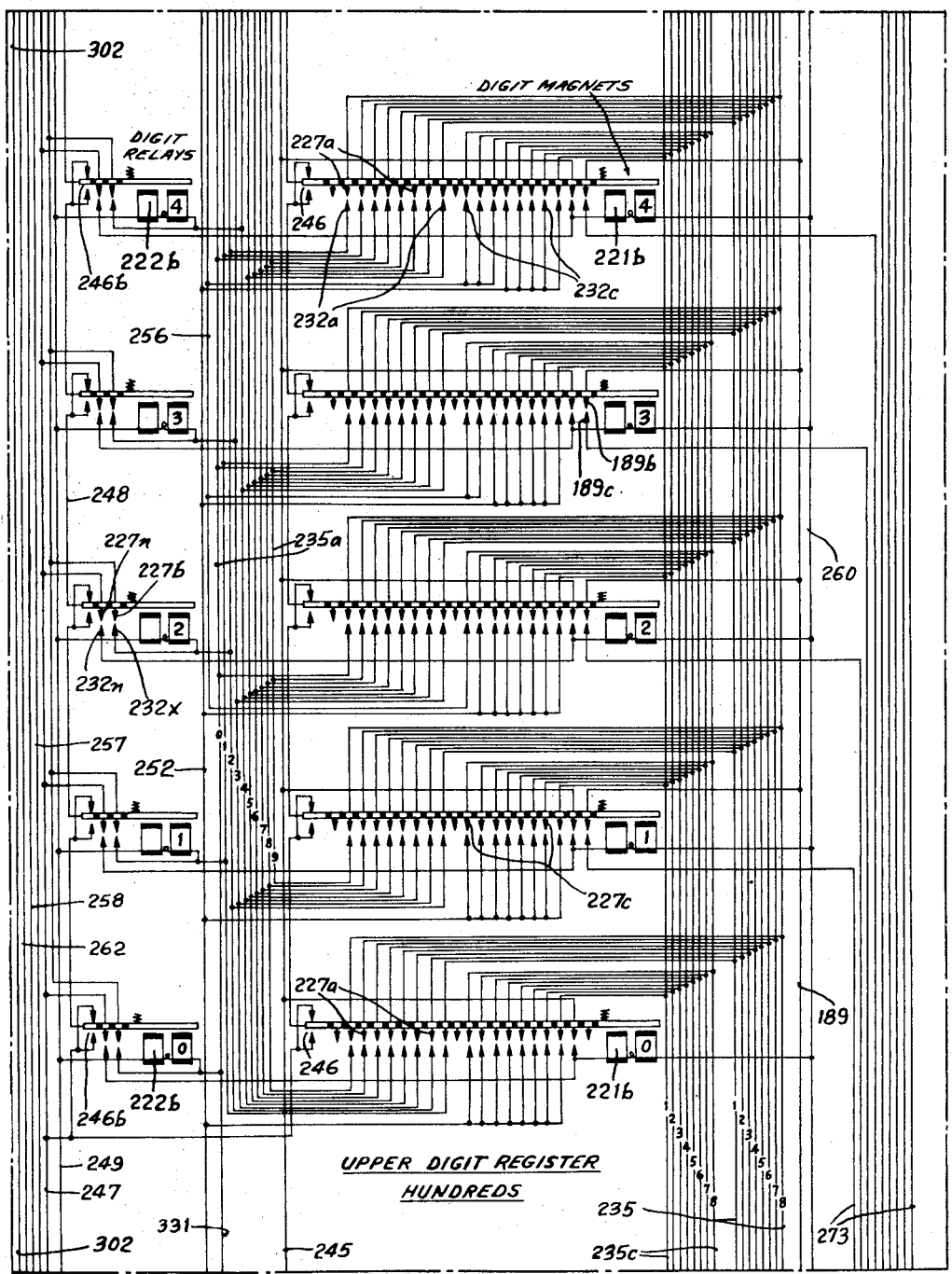
Figure 21F:
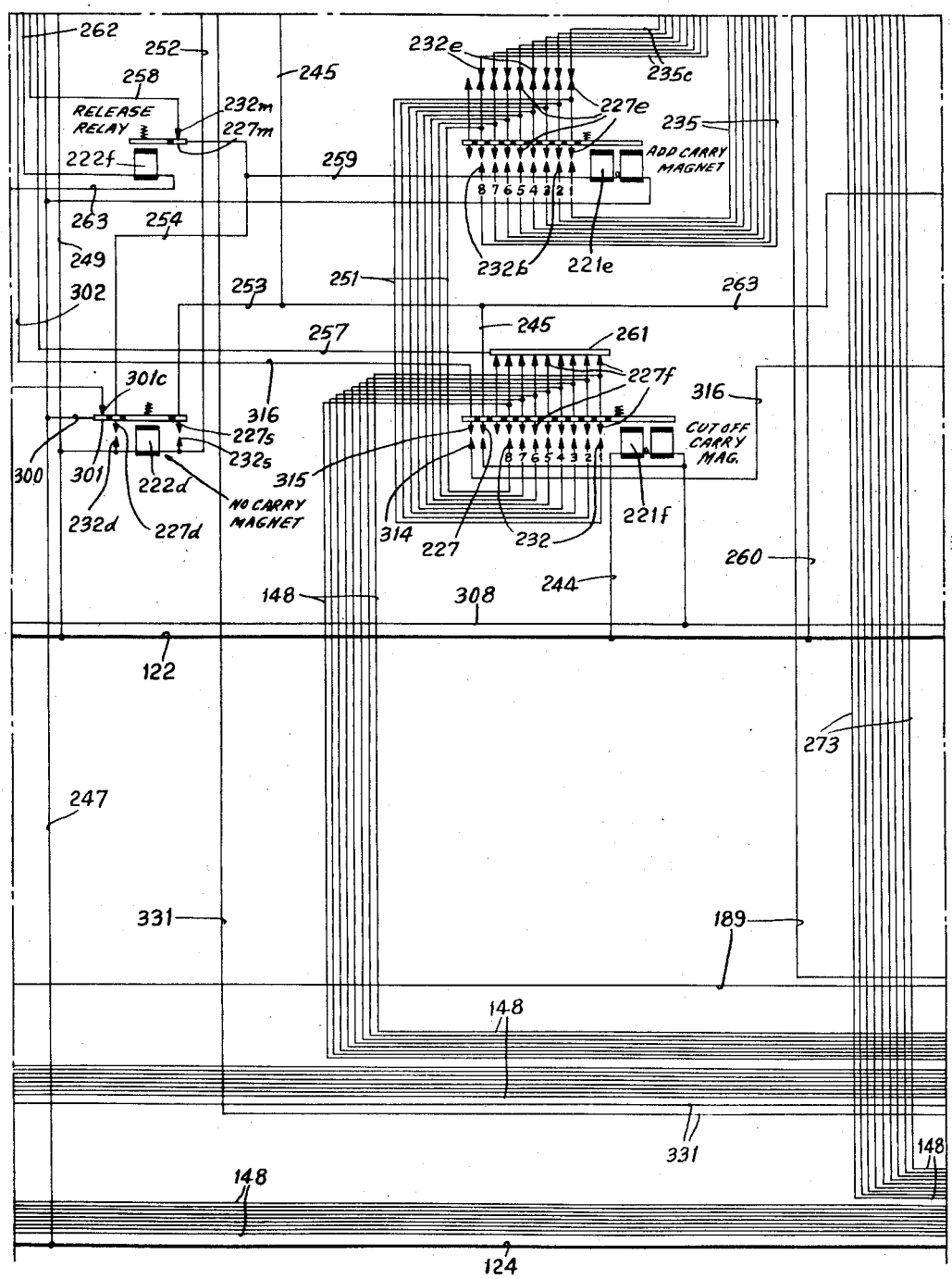
Figure 21G:
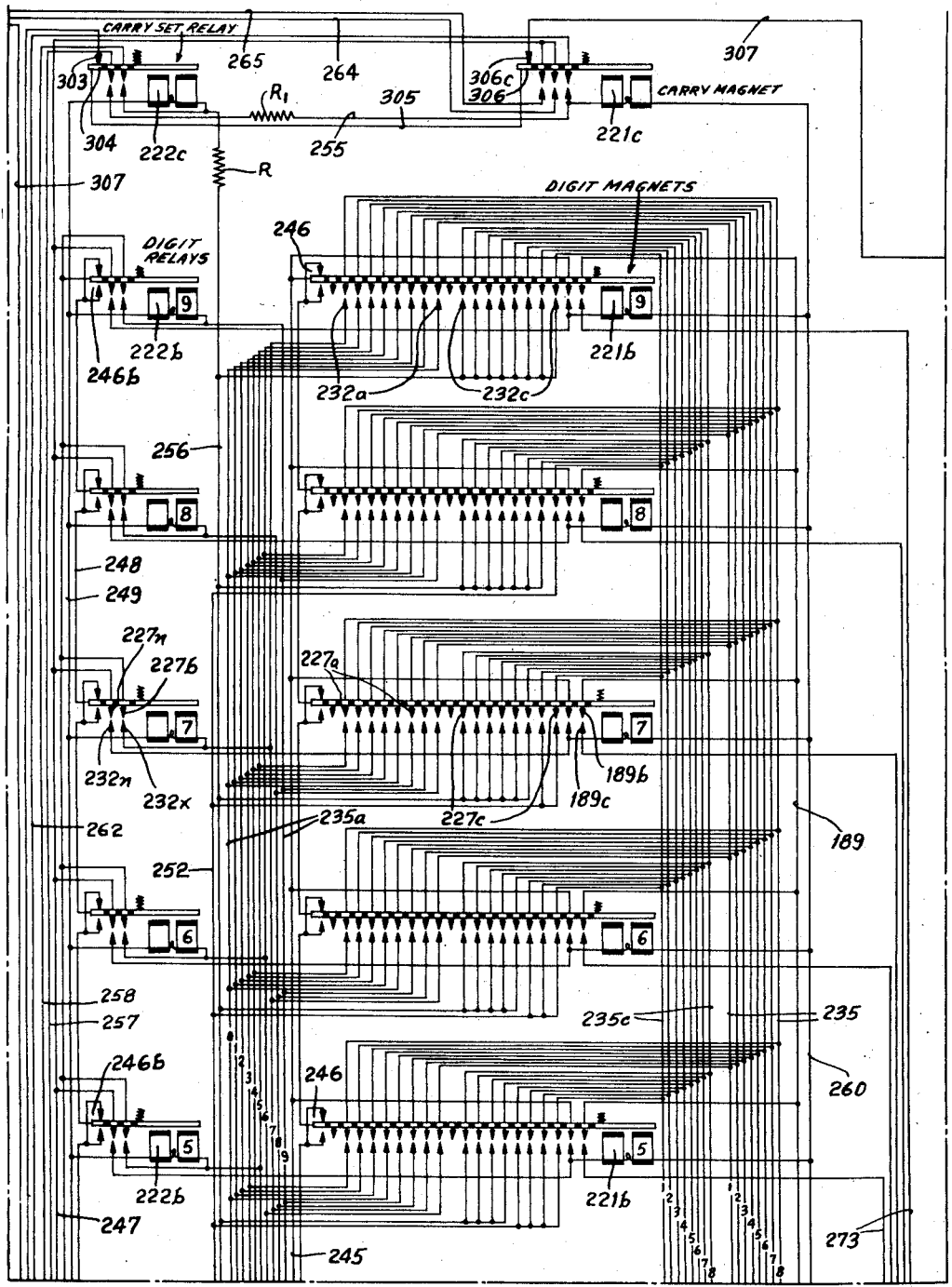
Figure 21H:
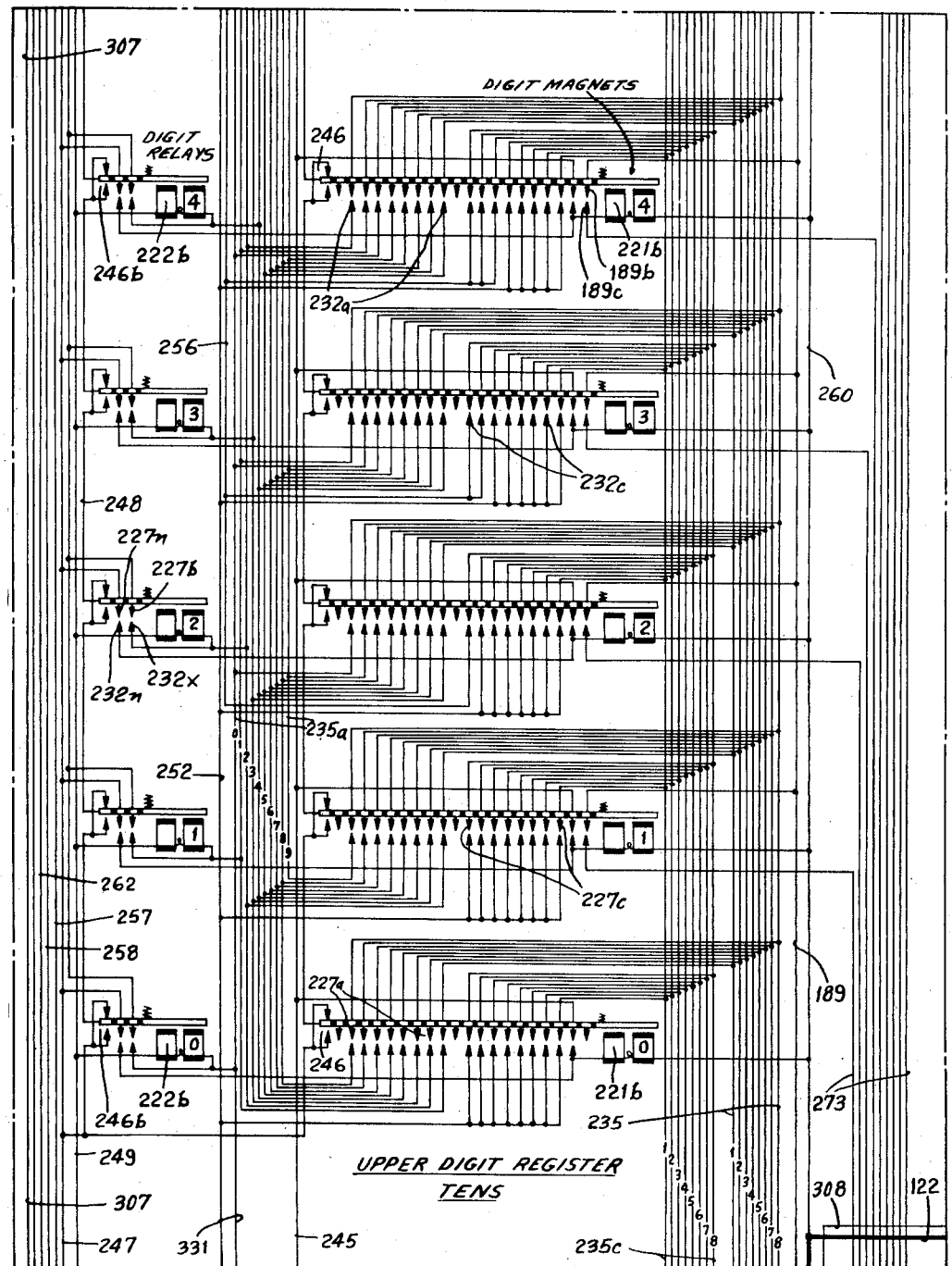
Figure 21I:
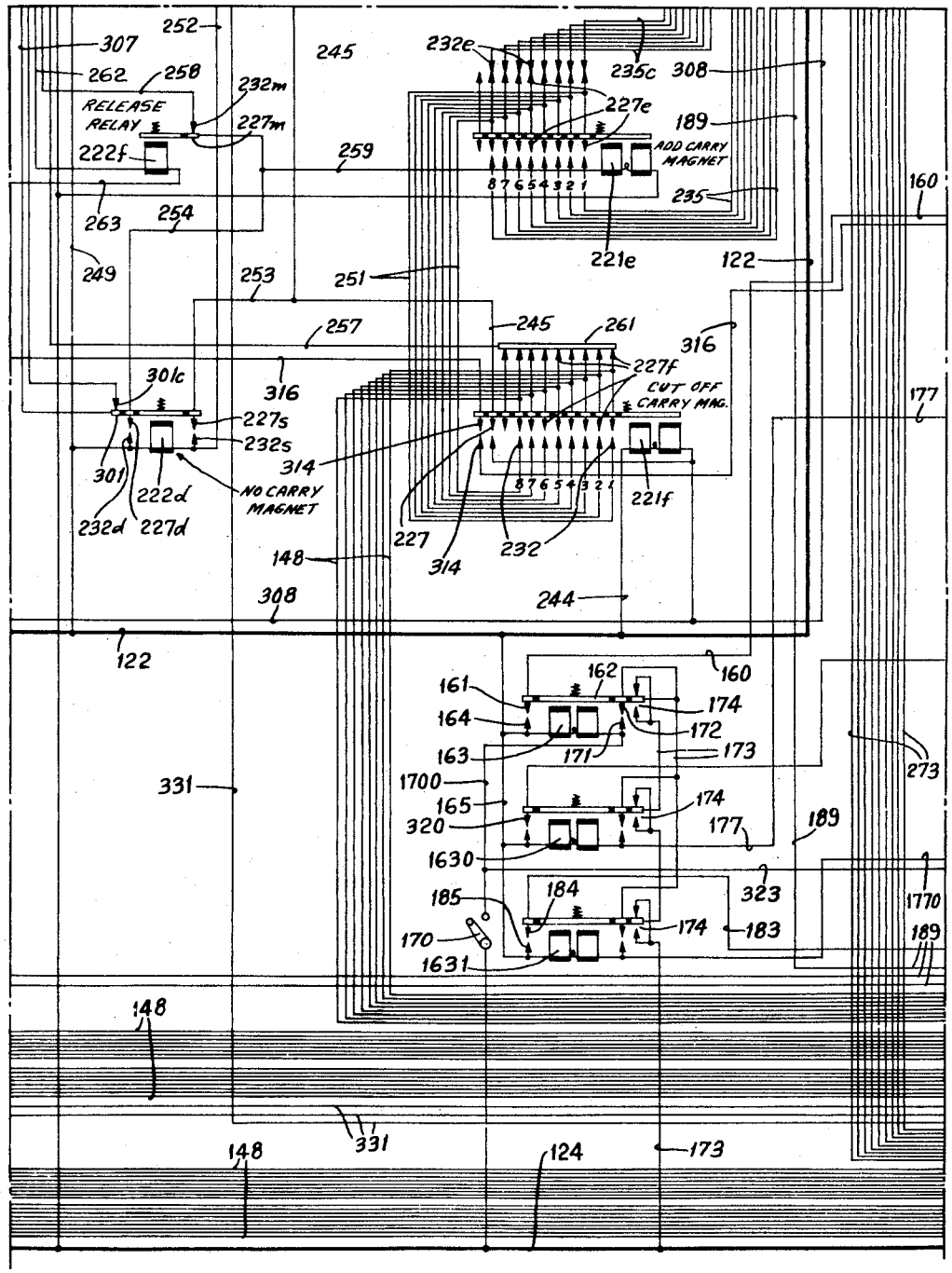
Figure 21:
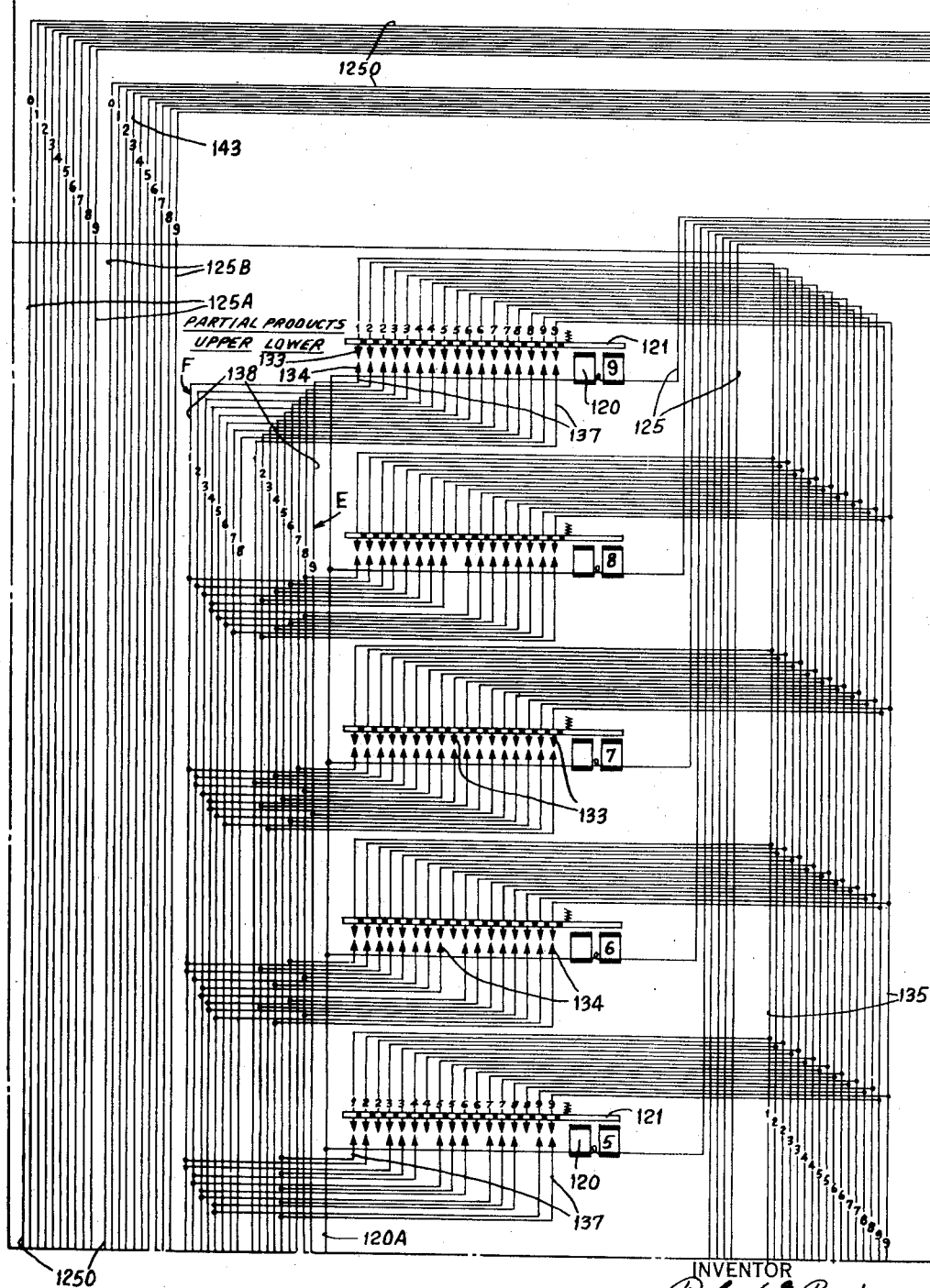
Figure 21K:
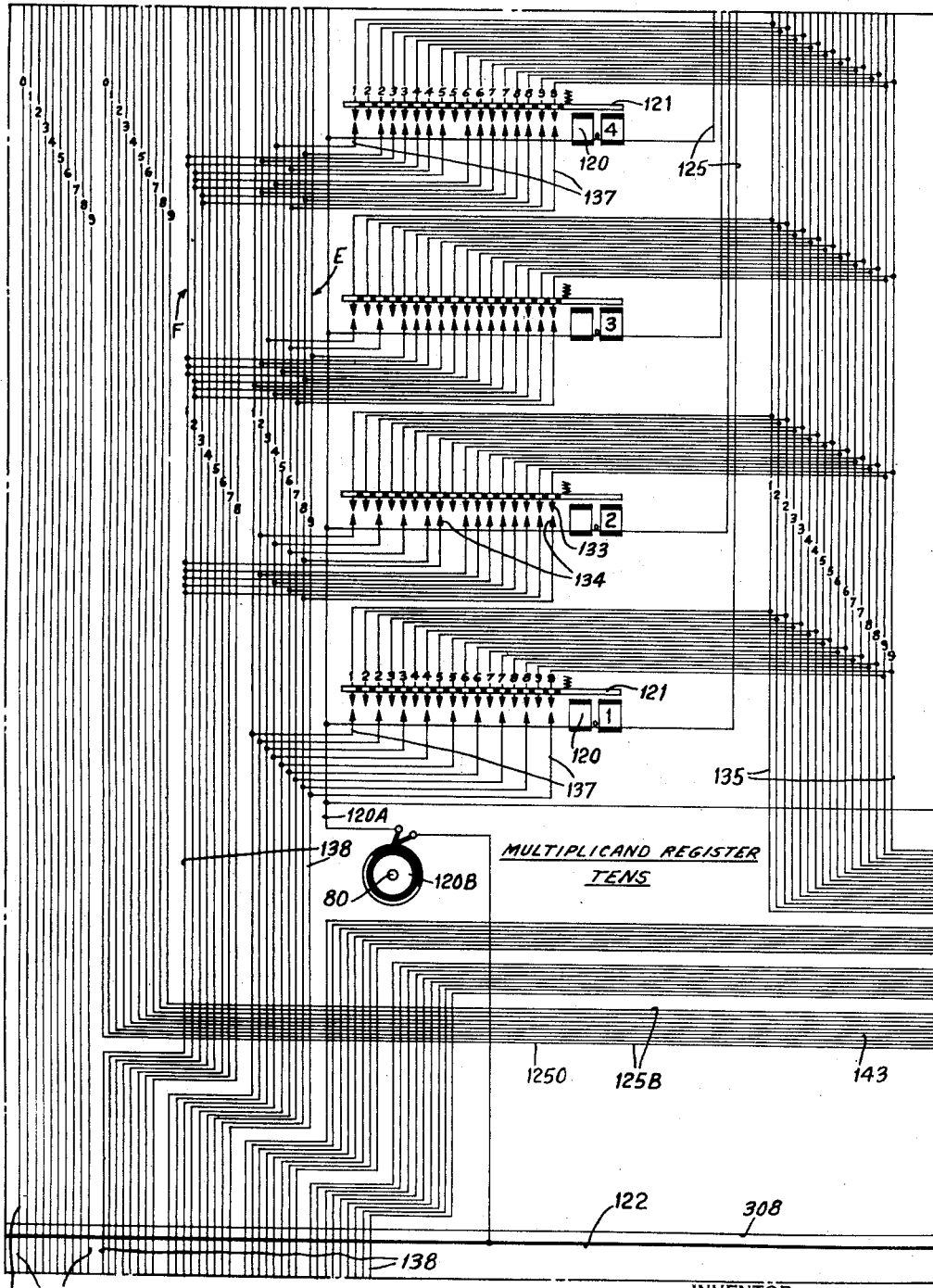
Figure 211:
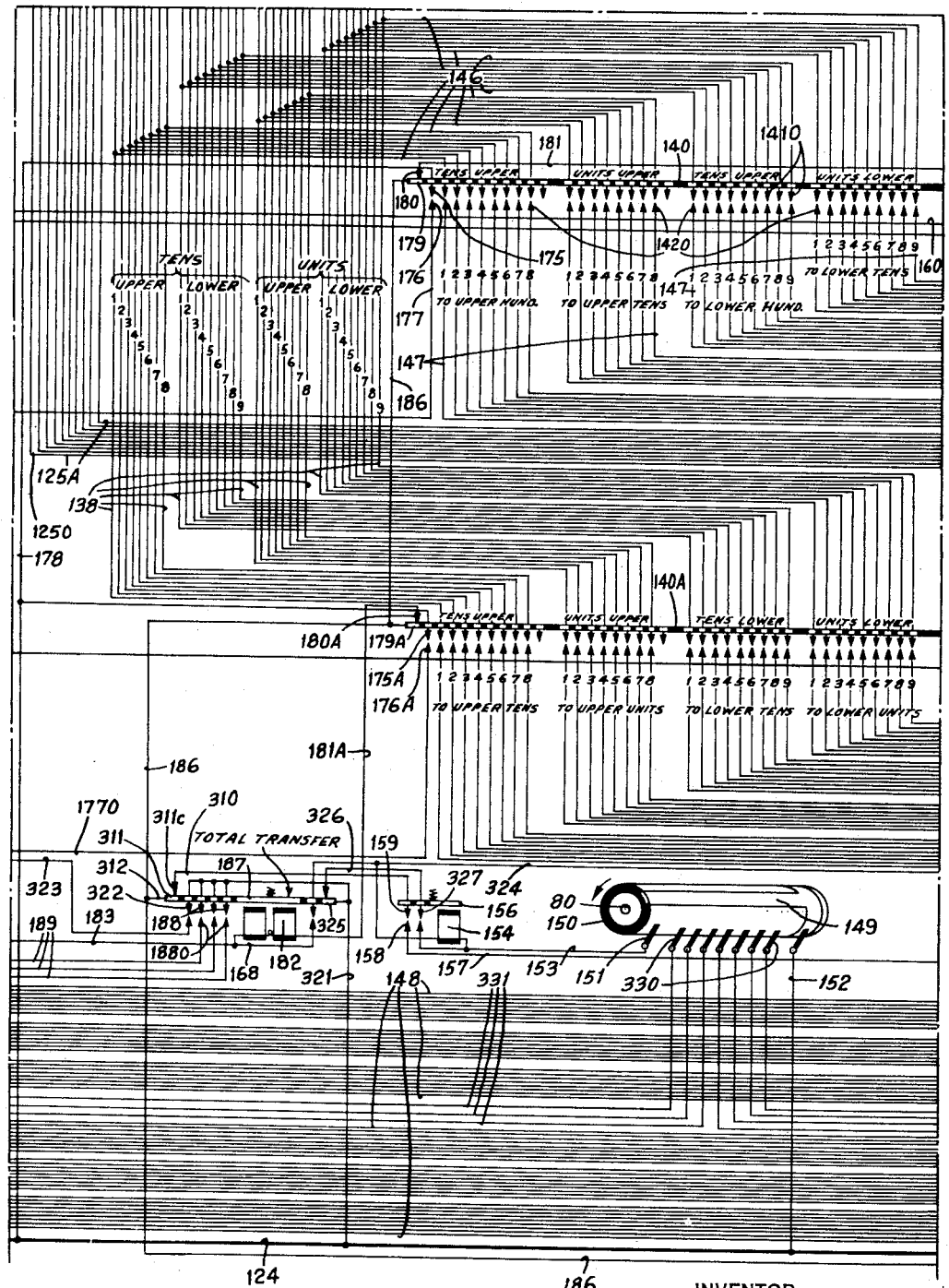
Figure 21M:
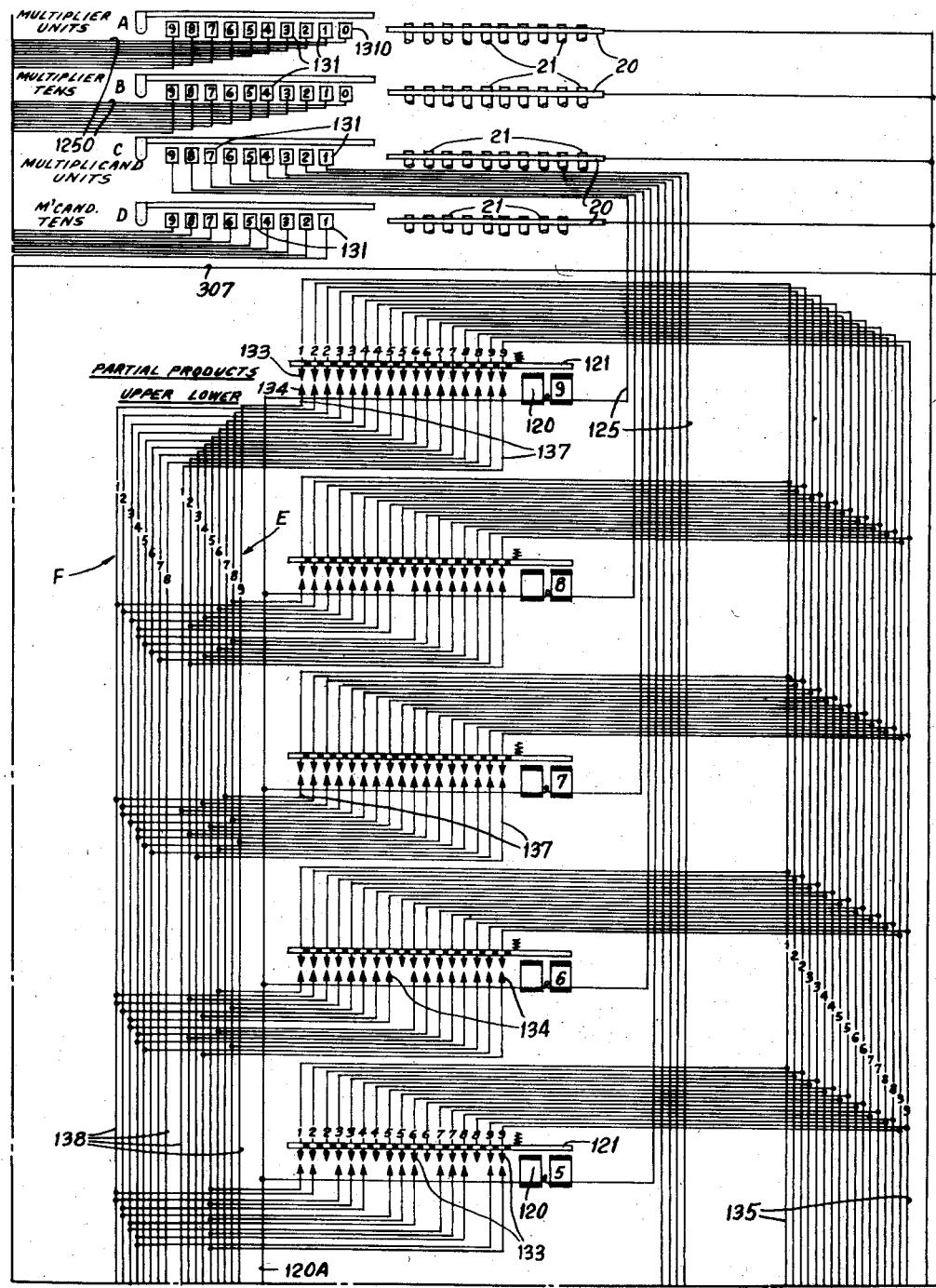
Figure 21N:
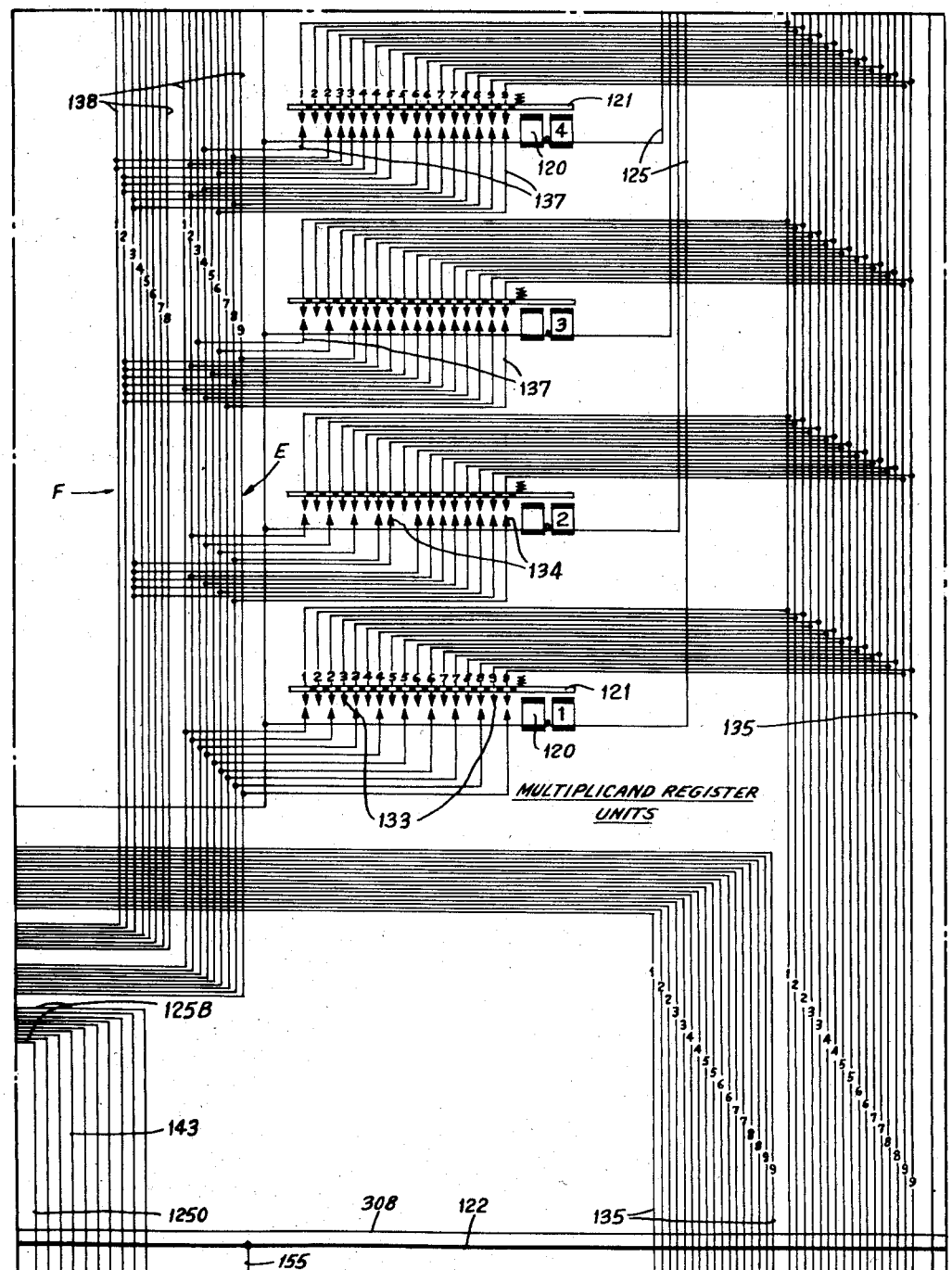
Figure 21O:
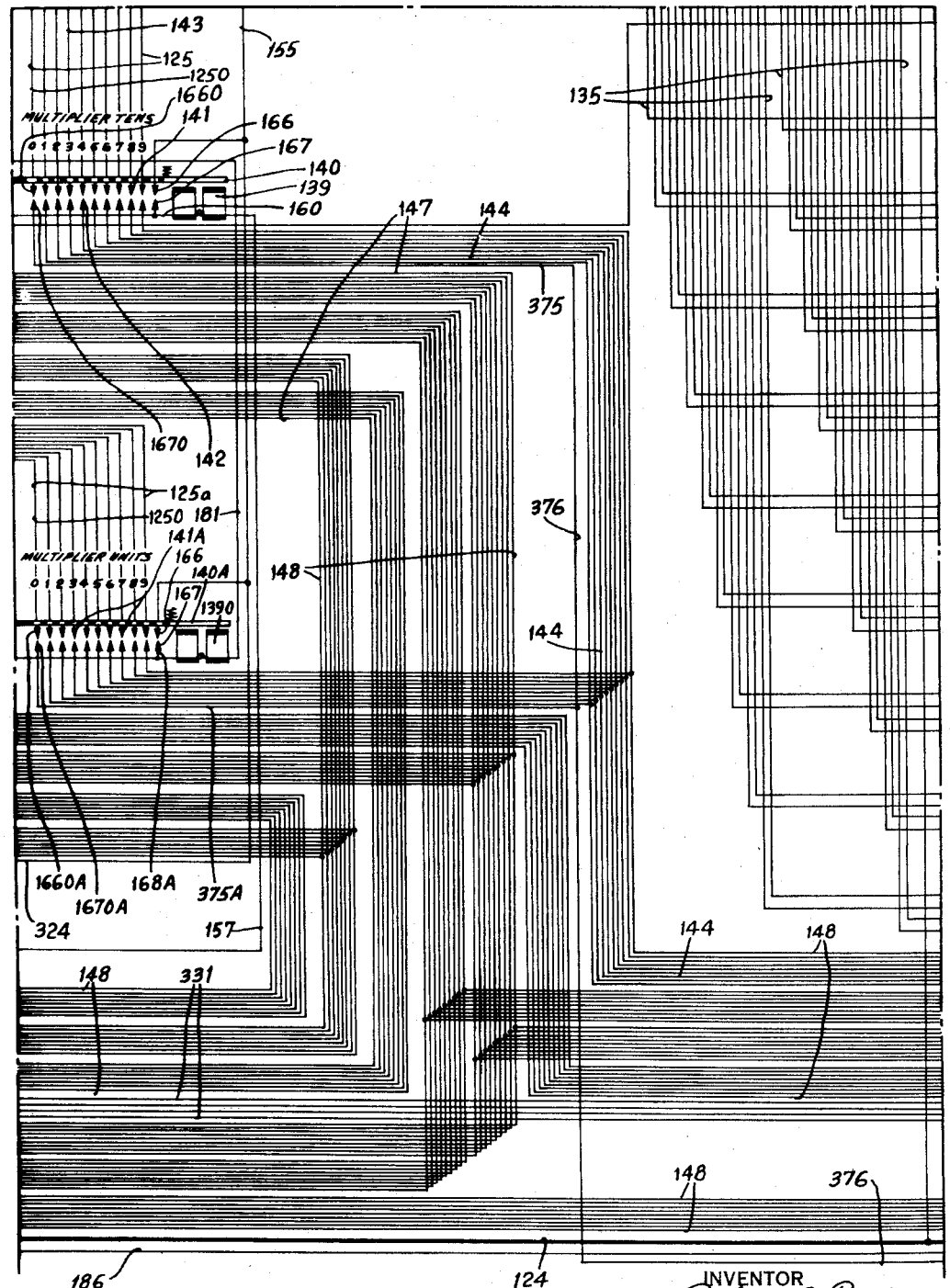
Figure 21P:
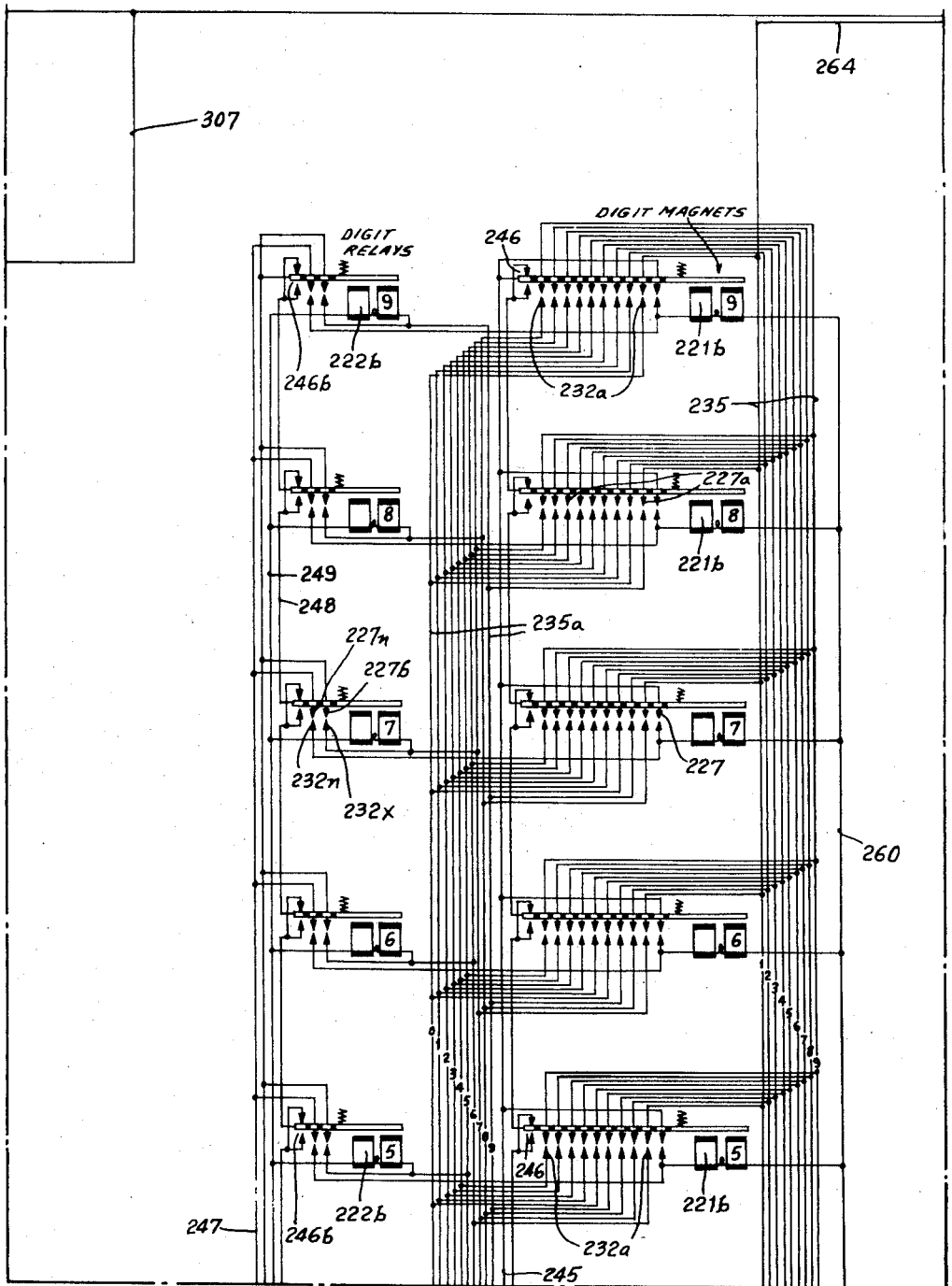
Figure 21Q:
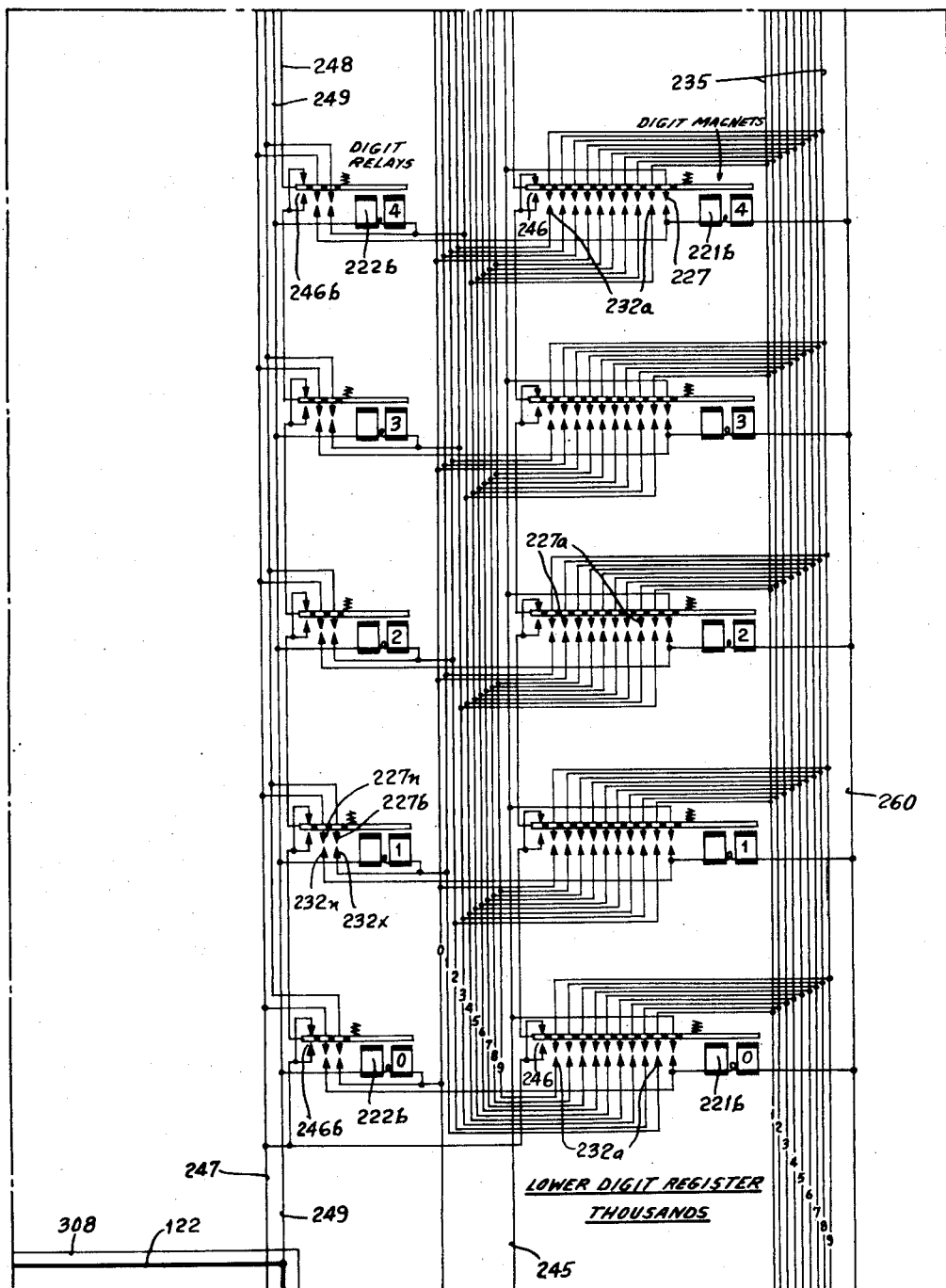
Figure 21R:
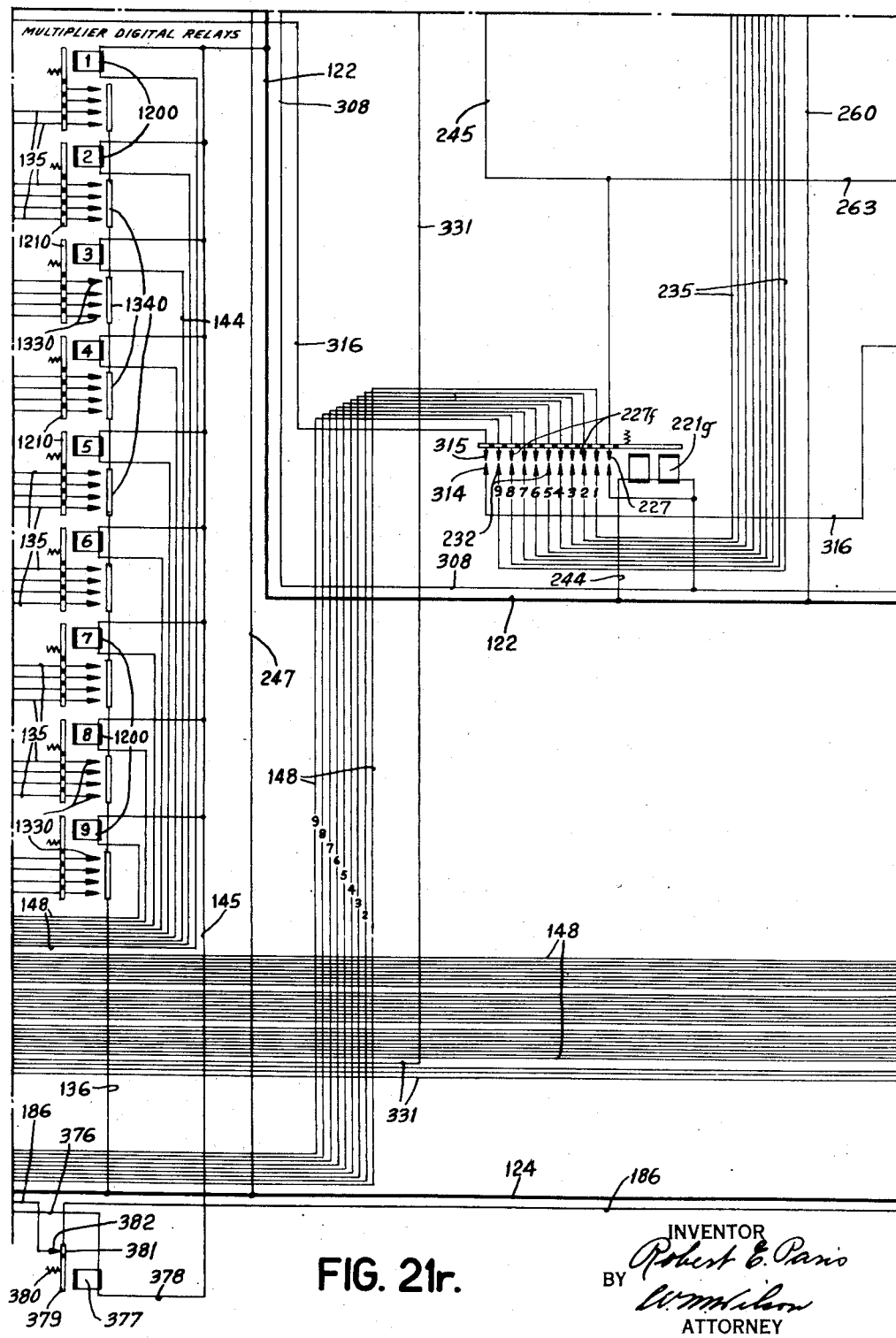
Figure 21S:
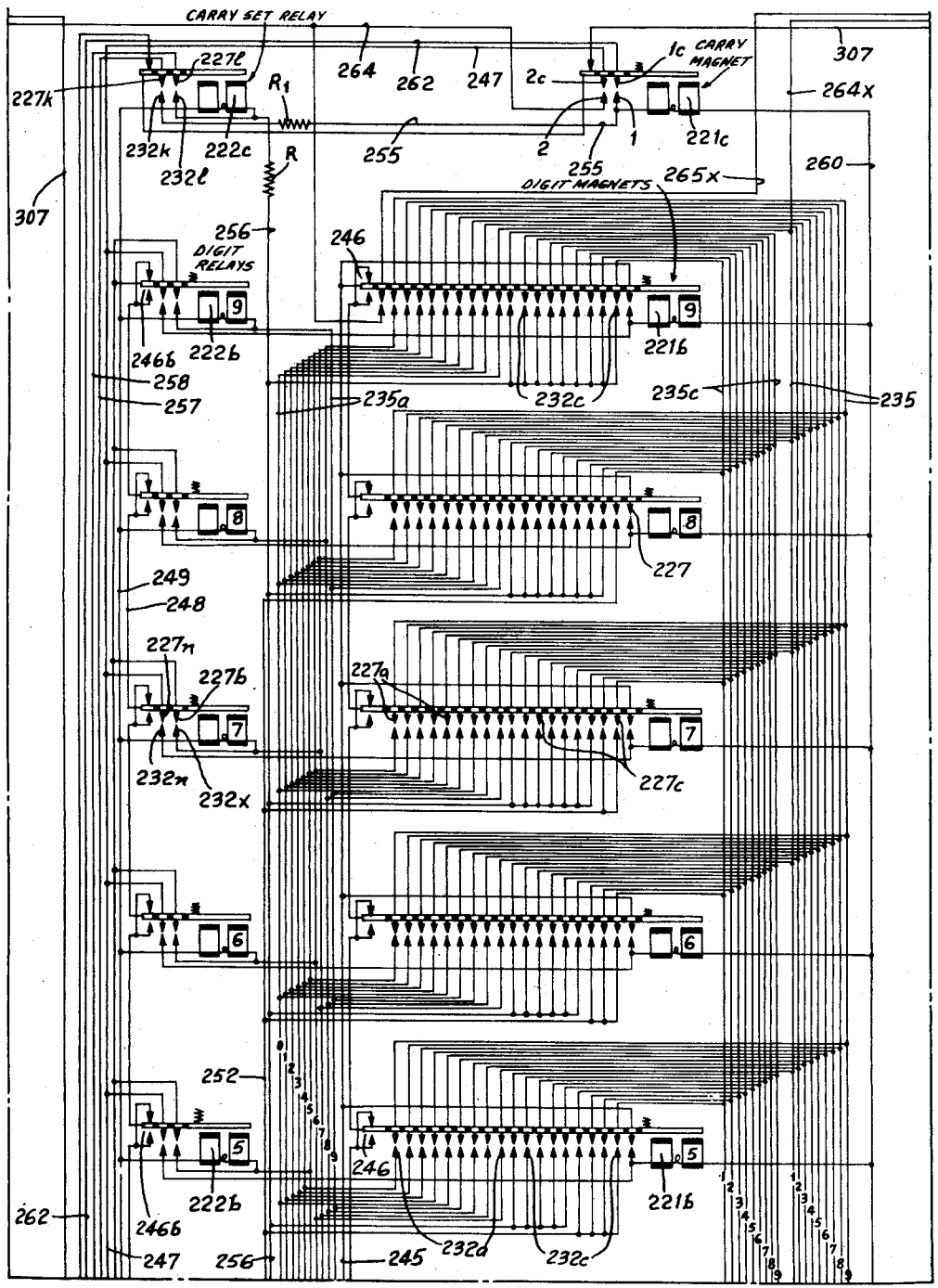
Figure 21T:
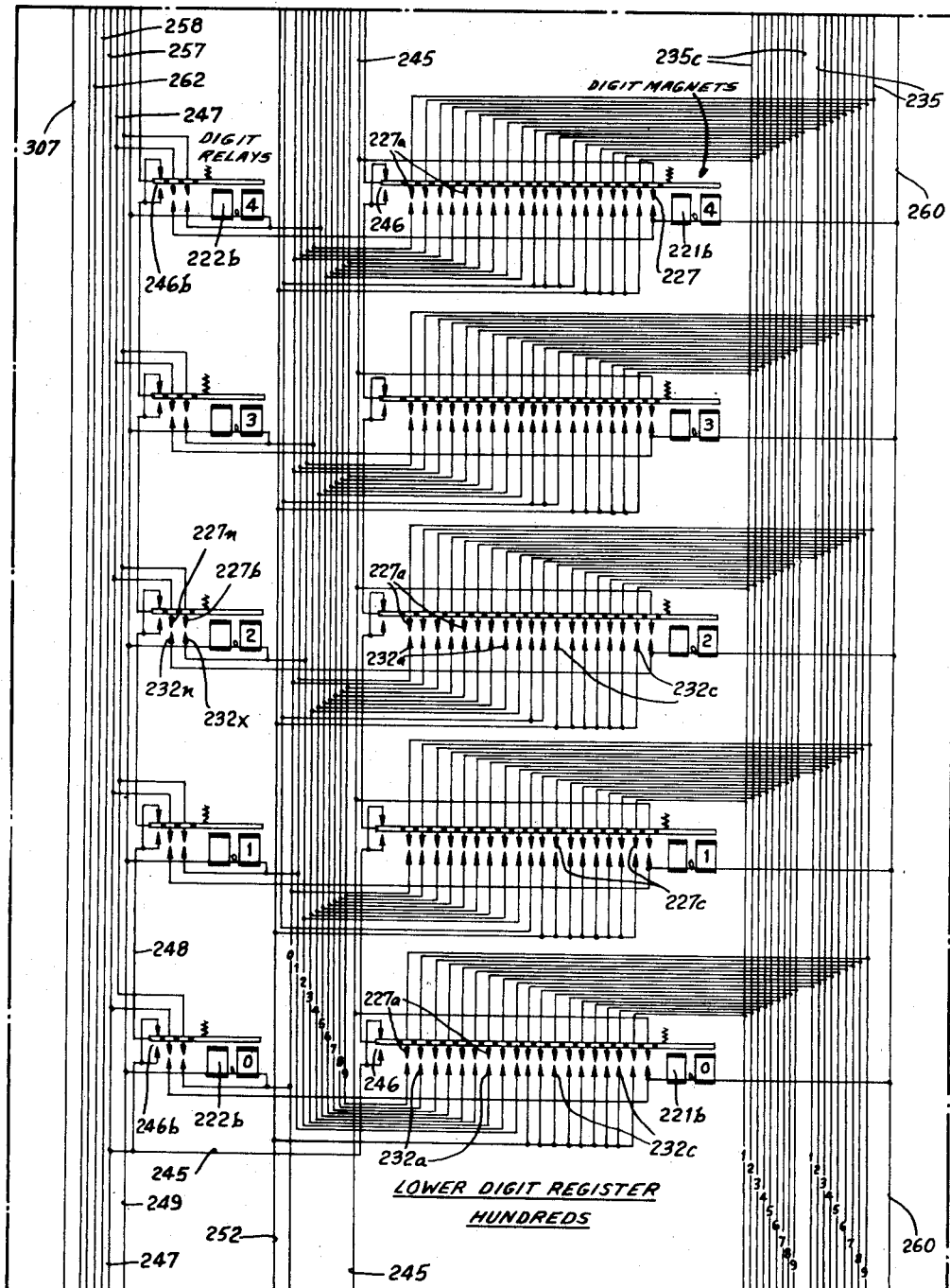
Figure 21U:
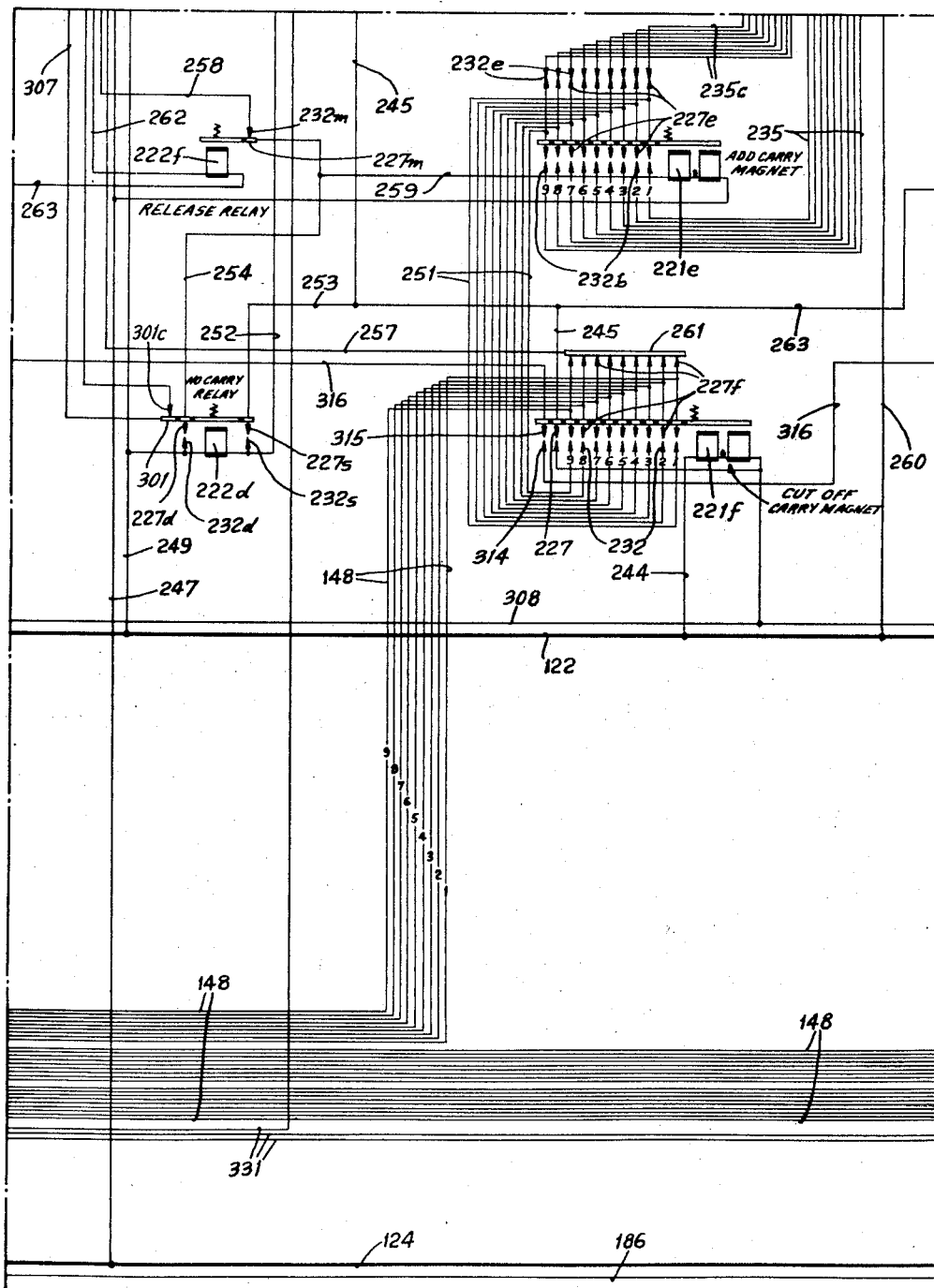
Figure 21V:
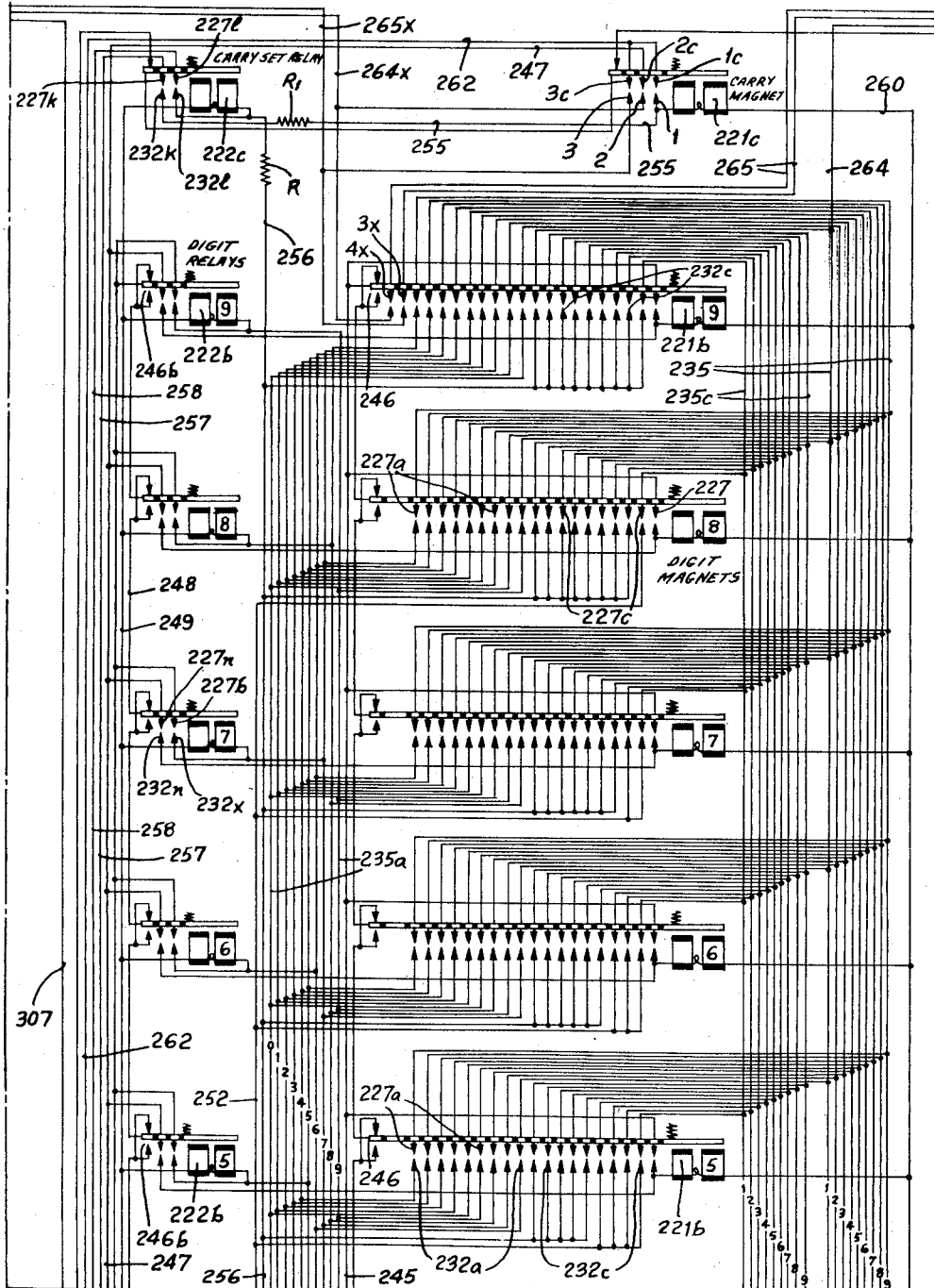
Figure 21W:
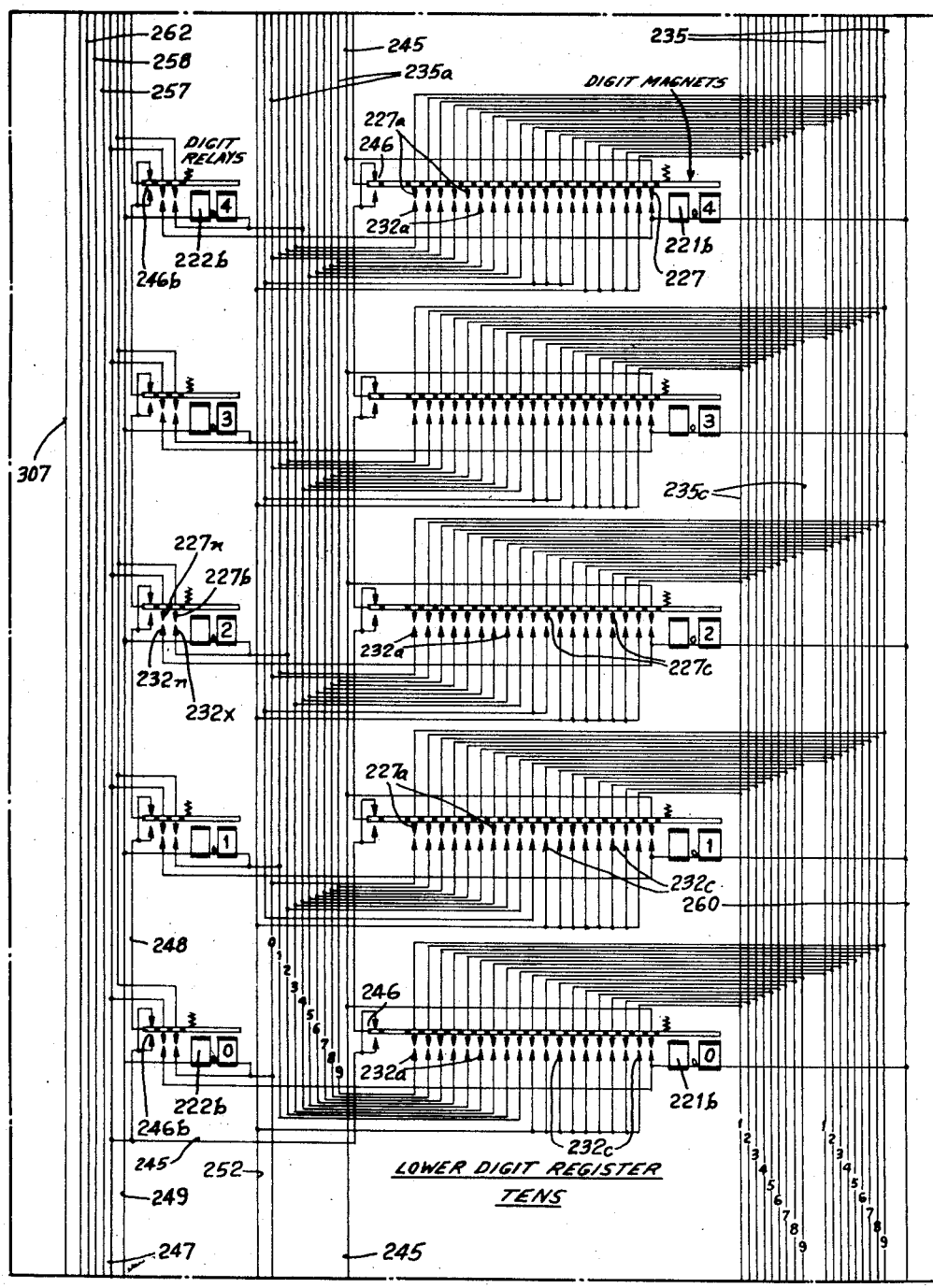
Figure 21Y:
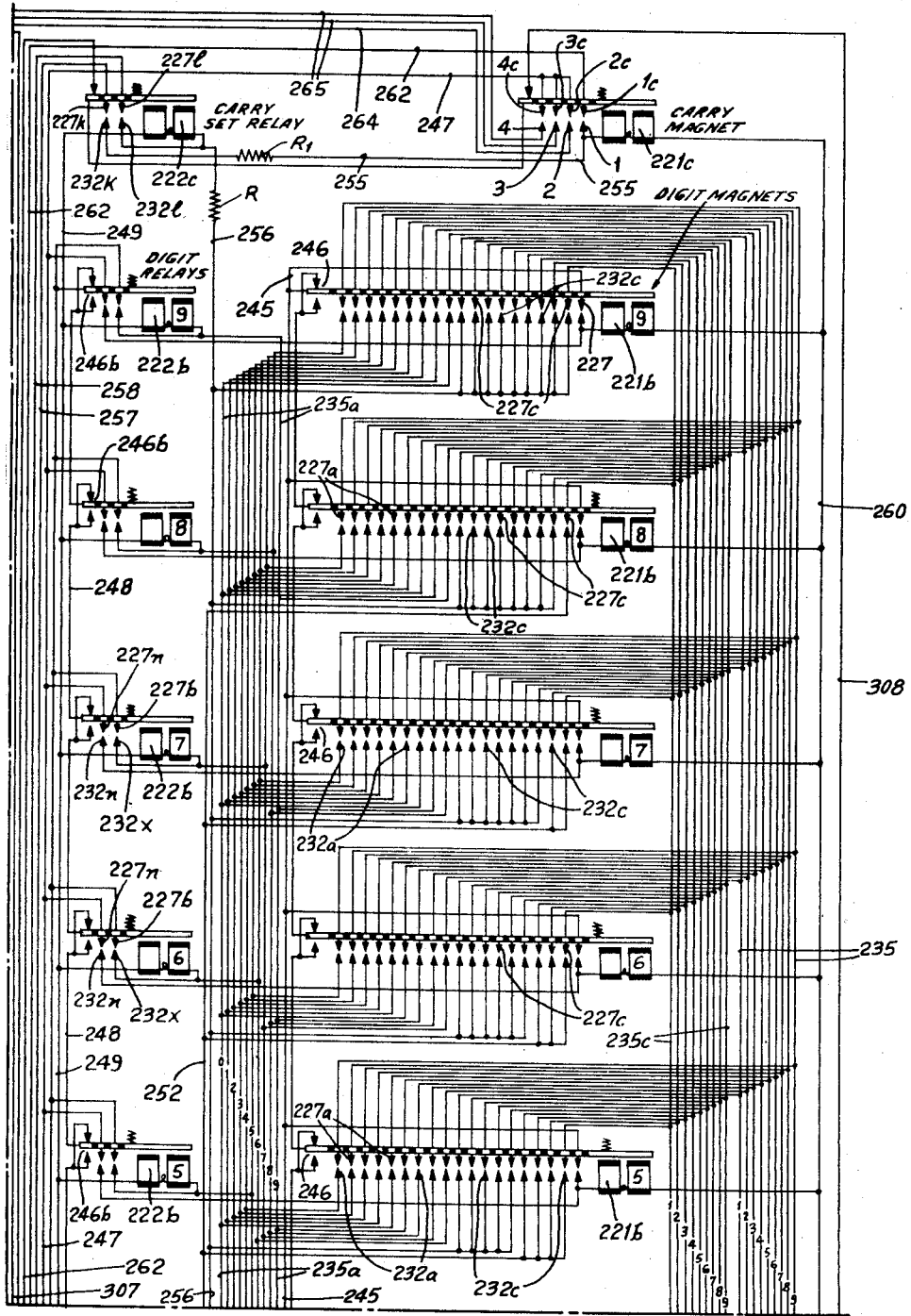
Figure 21X:
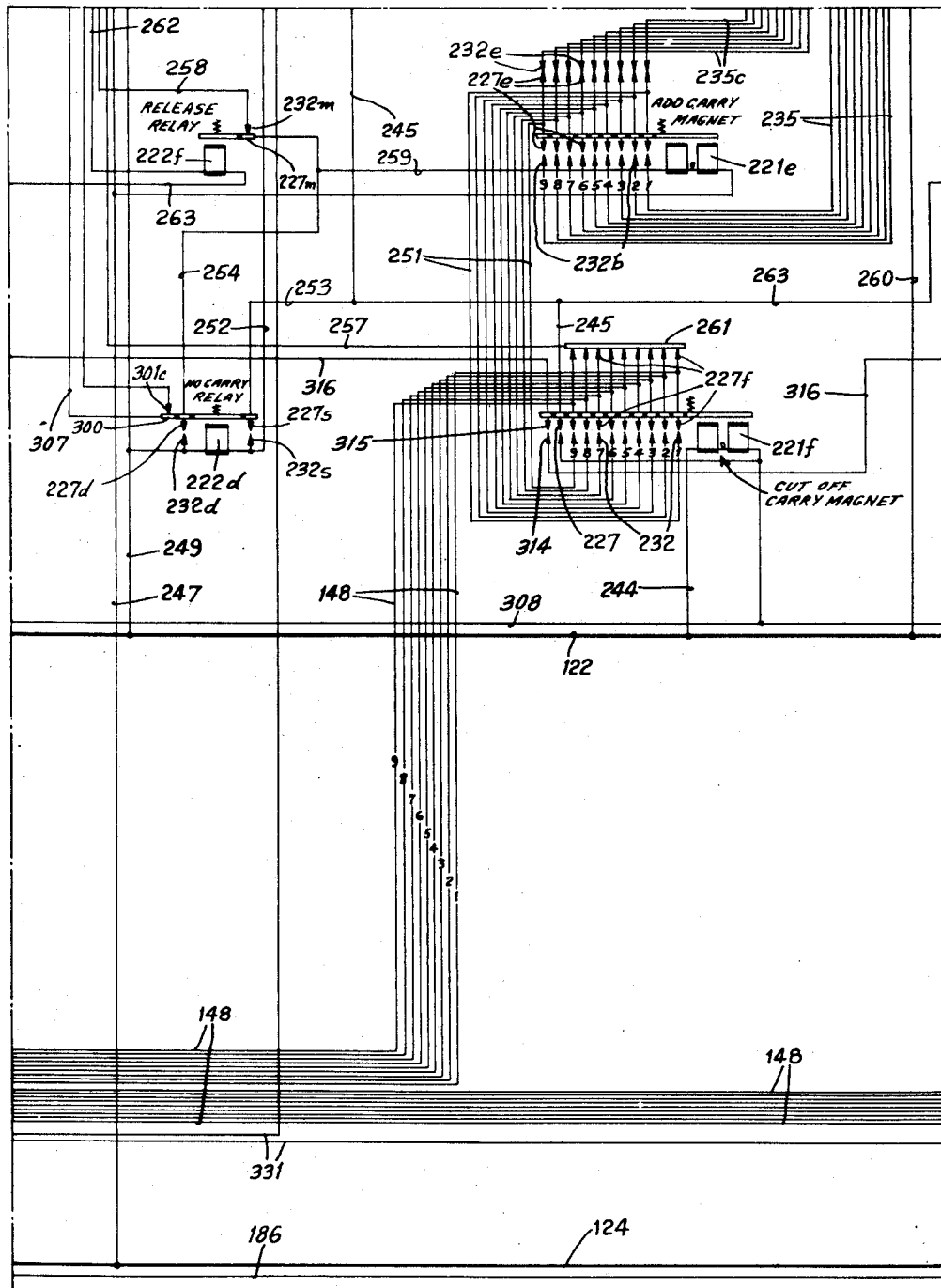
Figure 21Z:
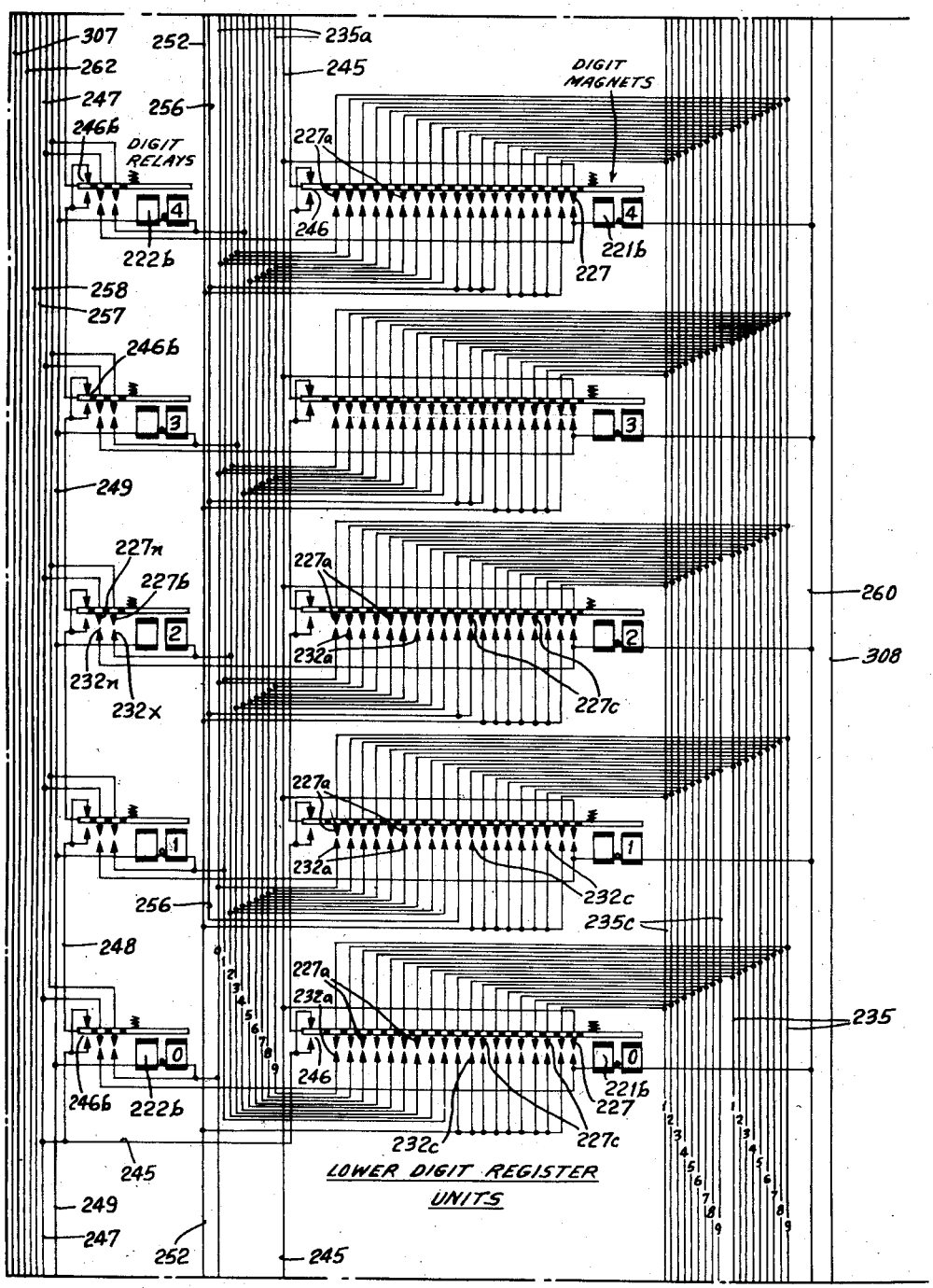
Figure 21Z:
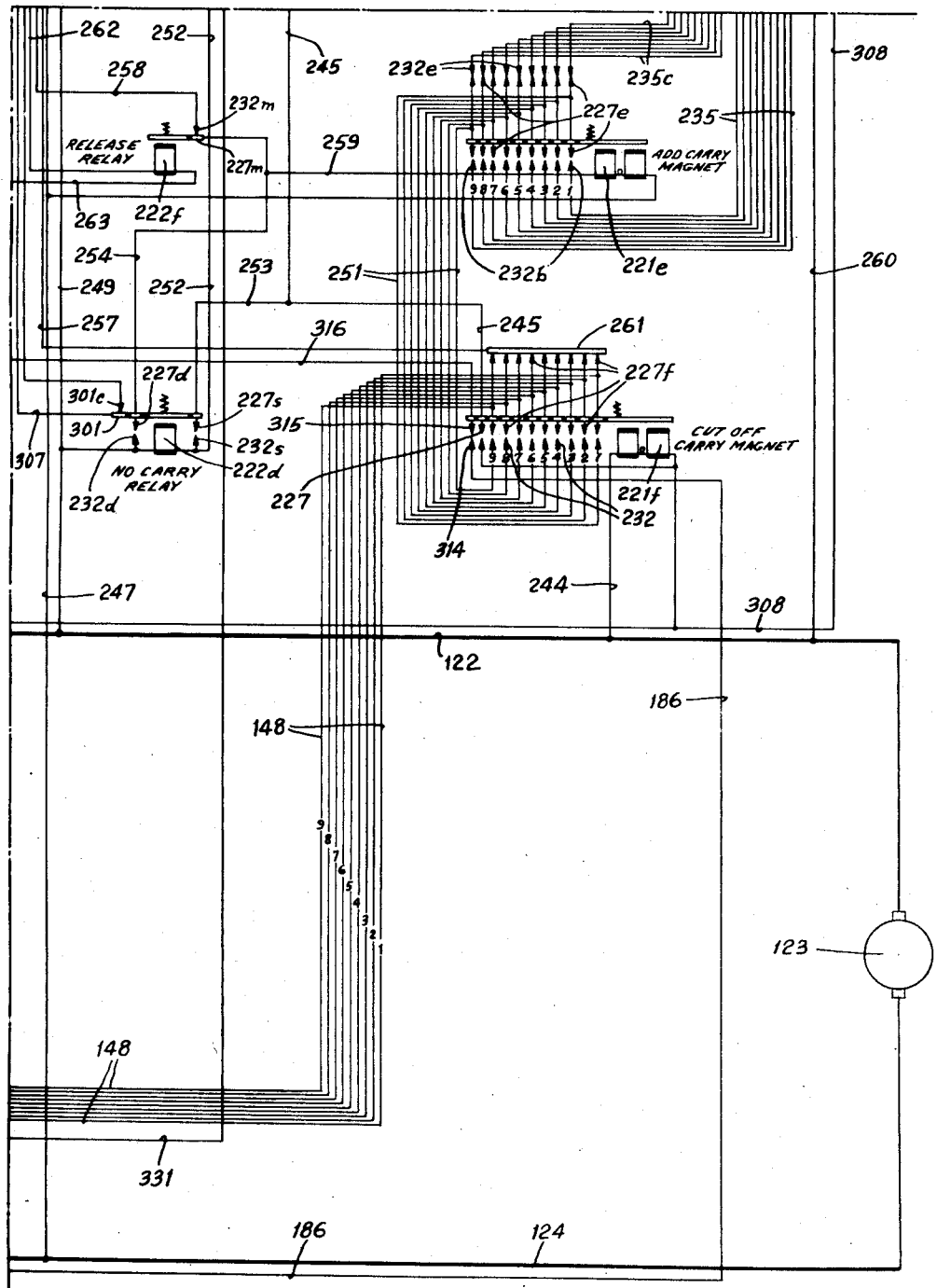

Figs. 21a–21zz inclusive when assembled show a typical wiring diagram for the entire machine.

Fig. 22 is a diagram showing how the individual sheets of wiring diagram should be assembled to show the complete wiring diagram.

Fig. 23 is a timing diagram showing the timing for certain parts of the machine.

In the accompanying drawings, I have shown the present invention as applied to a well-known form of tabulating machine, known commercially as the Powers tabulator, the pertinent parts of which are well shown in Fig. 1 of the patent to J. Powers, 1,236,481, entitled Card accounting machine, issued Aug. 14, 1917. However with slight changes the present device can be used on other well-known forms of tabulators, the Powers form being utilized merely as an example.

Framework

Besides the ordinary framework of the well-known Powers tabulator, the elements of which are indicated by the reference numeral 25 (Fig. 1) there is also provided a base plate 26 (Figs. 1 and 11) which extends from the machine frames to support the magnets of the calculating mechanism hereinafter fully described. There is also a framework for the "flexible connection box" which will be described in detail hereinafter.

The broad principles of the calculating mechanism are claimed in said pending application Serial Number 302,453, while those of the preliminary representation device are claimed in my pending application Serial Number 324,427, now Patent No. 2,063,118. The present invention is directed to the combination of these two mechanisms into an automatically controlled calculating mechanism.

Tabulator pins (Figs. 1, 21m)

The upper plate of a pin-box is indicated at 20, the pins being indicated at 21. In the Powers form of tabulator as shown in said Powers patent, these pins operate wires of what is known as "connection-box" to set stops. Such stops are shown at 22 as mounted in a "stop-basket" 23. These stops when raised are frictionally held raised until returned by strips 24 operable by a bell-crank 19 controlled from the shaft 80 of the tabulator, and when raised, they control the excursions of actuating racks or segments and printing sectors as shown in said Powers patent. If a raised pin 21 be in either the multiplier or multiplicand zone, it will, by means hereinafter described, control certain multiplying instrumentalities, as hereinafter fully set forth.

Stop controlling mechanism (Figs. 1 to 10, inclusive)

Taking up next the controlling mechanism between pins 21 (Fig. 1) and stops 22, numerals 27 and 28 represent front and rear cross bars upon which are removably mounted a series of bars or rails 29, there being one rail 29 for each denominational row of pins 21 of the multiplier and multiplicand zones and located directly thereover. The rails may be suitably spaced by collars or washers and all rails are locked in place by a locking bar 30 extending across the rear ends of all of the rails. Each rail 29 carries an adding slide 31 and a second slide 32 which slides are mounted for sliding movement longitudinally of their respective rails 29. The slides of each rail are constantly urged toward each other by a spring 33, but are normally held apart by universal bars 34 and 35.

The pins 21 are all in contact with the guide plate 20 which is connected to the positive side of a source of electric power. Each rail 29 is of inverted U-shaped cross-section (see Fig. 5) and carries a contact plate 36, provided with a lead 38. The contact plates 36 are insulated from the rails 29 by insulating material indicated at 40. The slides 31 are constructed from stampings, the lower edges of which are spaced apart at the bottom to carry pairs of contact strips 42. These strips are formed with springy fingers 43 (Fig. 5) pressing against plates 36 and the inner ends are bent sidewise so as to form a V-like throat as shown at 44 (Figs. 1 and 6). The strips 42 are separated from the slide members 31 by insulation strips 45. The leads 38 connect the several contact plates 36 with respective adding bars 46 (Fig. 9) which are mounted in a frame 47 secured to the front of the machine. The vertical strips or bars 46 are insulated from each other in any suitable manner and are formed with the upper surfaces grooved longitudinally,—that is, the upper surface is of V-shaped cross-section as clearly shown in Fig. 9.

Mounted in the frame 47 are bars 49 (Fig. 9) of insulating material upon which are mounted cross members or rails 50 preferably of rectangular cross-section, the bars 50 being of conducting material and each provided with a lead 51 which passes to one side of a respective electro-magnet 52, Figs. 1 and 10. The other side of the electro-magnet 52, is connected by a lead 53 (Fig. 10) to one side of a motor generator 54, the positive side of which is connected by a lead 55 to the pin plate 20.

Mounted on each of the bars 50 are adding slides 61. The slides 61 are preferably of insulating material and provided with finger-pieces 63 whereby they may be moved along their respective bars 50. Each slide 61 is provided with a V-shaped spring contactor 64 which is constantly in engagement with the respective bar 50 and the center portion of which may be moved into engagement with the grooved upper face of any one of the bars 46. It will thus be seen that by moving any slide 61 along its bar 50 any one of the contact plates 36 may be brought into circuit with any one of the electro-magnets 52.

It will also be seen that by putting a plurality of slides 61 in contact with a single bar 46, a plurality of magnets 52 may be simultaneously actuated by action of a single slide 31. This is useful where data of a single zone is to be entered on two or more accumulators of the tabulator head.

There is a bar 29 for each row of pins 21, there being one row of pins 21 for each column on the data or controlling card. There is one electro-magnet 52 for each row of stops 22, each row of stops 22 being associated with a respective accumulator. Therefore, each bar 46 represents a respective one of the accumulator wheels and by properly adjusting the slides 61, any digit represented on the data card may be added to any accumulator wheel or plurality of such.

At the right and left hand sides of the frame 47 are grooved strips 66 (Fig. 9) which have no connections 38 and when the spring contacts 64 engage these bars no circuit can be closed for operating the respective electro-magnets.

The cross bars 34 and 35 extend through slots 68, Fig. 1 in the housing 69 of the rails 29 and are secured at their ends to respective links 70 and 71 at opposite sides of the housing. The links 70 are pivotally connected to the lower ends of rock arms 72 pivoted on cross-shaft 73; and the links 71 are pivotally connected to the lower arms of rock levers 74 pivoted on a cross shaft 75. Links 76 and 77 connect one of the rock-arms 72 and one of the rock levers 74 with an eccentric strap 78 operable by an eccentric 79 mounted on the rotatable shaft 80 of the machine. While only one each of members 70, 71, 72, and 74 is shown, in Fig. 1, it is to be understood that there is one of each at each end of the housing 69 so as to ensure parallel movements of the bars 35 and 34.

One rotation of shaft 80 corresponds with one cycle of the machine, as shown by the timing diagram of Fig. 23 and with the parts in the position shown in Fig. 1, it will be considered that a card has been fed during the initial portion of the cycle, as shown in Fig. 23 to the pin box and that certain pins 21 have been raised to indicate the data punched in the card, such pins 21 being thereafter held raised, as shown in Fig. 23. The rotation of shaft 80 rotates eccentric 79 which causes arms 72 and levers 74 to draw bars 34 and 35 toward each other, and as bars 34 and 35 are moved, the slides 31 and 32 are moved by springs 33 to follow bars 34 and 35 as shown by the timing in Fig. 23 until stopped by elements 44 abutting against a raised pin. When the elements 44 contact a pin 21, a circuit is closed through that one of the electro-magnets 52, with which the co-operative slide is conected by one or more of the contactors 64. Of course, if no contactor 64 is positioned to be in circuit with the elements 44 of a slide 31, then no electro-magnet is operable thereby. However, when an electro-magnet is in circuit with such elements 44, and the circuit is closed by the elements striking a pin 21, that particular magnet is energized with results which will now be set forth.

Mounted on shaft 80 so as to be turned therewith is a cam 81, shown in Fig. 1. The cam 81 has a roller 82 riding on its periphery, such roller being mounted on the lower arm of a bell crank 83. The bell crank 83 is pinned on a cross-shaft 84 having a pair of substantially horizontal arms 85 extending under the stop basket 23, only one arm 85 being shown in Fig. 1.

Secured to the arms 85 is a cross-bar 86 so as to form a frame. Extending upwardly at each end of this frame is an ear 87, the ears 87 supporting between them a pivot rod 88, upon which are mounted the rear ends of rails 89, the connection being by slots in bars 89. There is one rail 89 for each row of stops 22 and arranged thereunder. The front ends of the rails 89 are mounted on a cross-rod 90 carried by ears secured to the frame member 25. Mounted on each rail 89 is a slide member 91 formed with a downwardly extending portion 92, and with a series of ten teeth 93. Each slide member 91 is also formed with four bent lips 94 by which it is retained on its bar or rail 89. For each slide 91 there is provided a stop actuator 95 which is formed with a spring ear 96, a bent over lip 97 and a stop-actuating finger 98. Each actuator 95 is slidably secured to its slide 91 by a screw 99 which passes through a slot 100 in its respective slide 91; and is held in any one of ten positions on the slide 91 by engagement of its finger 97 in any one of ten notches 101 formed in the upper edge of each slide 91. Springs 102 tend constantly to draw members 95 and 91 toward the right in Fig. 1, and to hold fingers 97 in engagement with desired notches 101, the fingers 98 extend laterally across members 95 so as to give wide upper or stop-operating faces. The slides 91 are normally held in left-most position by a universal bar 65 carried by links 62 secured to the upper arms of levers 74. The bar 65 may be supported and guided in a slot in a frame or other stationary member (not shown).

Each of the electro-magnets 52 is provided with an armature 60 to the free end of which is movably attached a stop-rod 59, the stop-rods of all of the magnets being guided at their upper ends in apertures in a stationary-guide plate 58. Each of the stop rods 59 is positioned under the slide 91 of the row of stops 22 with which the respective electro-magnet is associated.

When the machine starts to operate the rock levers 74 move the cross-bar 65 so as to permit the springs 102 to draw the slides 91 along their respective rails 89. When the elements 44 of an operative slide 31 contact a raised pin 21, the circuit is closed through the electro-magnet 52 with which it has been operatively connected and such magnet draws up its armature 60 thereby lifting its respective stop rod 59 until its upper end is in the path of one of the teeth 93 thereby stopping further advance of that particular slide 91. Inasmuch as bar 65 controls the slides 91 to move in timed relation with the slides 31, the stops 59 are raised so as to stop the bars 91 with the fingers 98 under the stops 22 corresponding with the raised controlling pins 21. Thus if the "2" pin 21 is raised the corresponding or associated slide 91 will be stopped with its associated finger 98 under the "2" stop 22.

After the several fingers 98 have been positioned under the proper stops 22, cam 81 acts upon roller 82 to rock the bell crank 83 thereby raising rod 88 and with it all of the slides 91. These slides 91 in being raised bring the fingers 98 into contact with the lower ends of desired stops 22, raising the latter at a time in the cycle shown in Fig. 23 for the timing "stops 22 raised for multiplier and multiplicand" so as to control the accumulators as is well understood in the art. In case no hole has been punched in a column of the card, the corresponding slide 91 will have moved its associated finger 98 beyond all stops 22 and no stop will be raised thereby.

A spring 57 holds arm 83 with roller 82 in contact with the periphery of cam 81.

Normally the fingers 97 are located in the first notch 101 as shown in Fig. 1. The remaining notches 101 are provided so that a number punched on the card may be arbitrarily changed when printed, as for instance, when a hole in "9" position may indicate factory No. 3, so that it is desired to print "3", etc.

The slides 31 are so positioned that when the elements 44 of a slide 31 reach the "9" pin 21, the corresponding finger 98 will be under "9" stop 22. This period of idle movement is provided because there are normally provided "11" and "12" pins 21 which are ordinarily disregarded in straight tabulation. By arranging elements 97 and 101 the "11" and "12" pins may be utilized to effect desired code designations such as factory, warehouse numbers, etc.

It will now be seen that by properly adjusting the slides 61, data on a card may be added; or amounts may be added in a plurality of columns. Also the use of two sliders permits data from two columns of the cards to be entered in a single column.

It will be seen also that the slides 91 and their members 95 form an intermediate representation device whereby the amounts may be retained and entered into the tabulator even after the card has started to be ejected, thereby providing for rapid operation.

The above described mechanism is utilized in the present machine to effect printing of multipliers and multiplicands and in a modified form of some of the parts as presently described, for effecting the extending of the products. It will of course be understood that certain zones on the control cards must be assigned to multiplier and multiplicand.

*Theory of operation*

Before starting to describe the means whereby the multiplier and multiplicand are set up and the product entered into the machine, it may be well for a moment to consider the theory of operation upon which the multiplying instrumentalities of the present machine operate. The theory is the same as that described in my application Serial No. 302,453, and may be stated as follows:

If we take the problem 59 multiplied by 37 we have, in ordinary multiplication 7 times 9 equals 63 as our first operation followed by 7 times 5 equals 35 which must be set one place to the left and have the 6 of the preceding operation added in to make the partial product 413. In multiplying through by the 10's multiplier 3 we have 3 times 9 equals 27 the second or lower digit of which goes in the ten's column; 3 times 5 equals 15 plus the 2 of the previous operation making 17, the digits of which go in the thousands and hundreds columns, respectively. We then add the partial products 413 and 177 (0) which together form the product 2183. In multiplying as above at each operation we have had two figures or digits and these might be tabulated separately and added like this.

```
   59
   37
  ----
   63
   35
   27
   15
  ----
 2183
```

It will now be obvious that we could start multiplying first by the 3 and then by the 7 and by arrangement of the partial products in the proper decimal position, our added products would give the correct result or final product.

Let us now consider that we separate each of these initial products into its digits, placing one digit at one side and the other digit at the other side and then adding our digits into two partial products, these partial products then being added together to form our final product, we would have as follows if we multiplied first by the left hand or higher order digit of our multiplier;

```
     1          5
     2          7
     3          5
     6          3
    ___        ___
    156        623
               156
              ____
              2183
```

This last form indicates the manner in which the present machine effects multiplication. The 59 would be set up and then when it was multiplied by the 37 the lower digit of each partial product would be entered in the proper denomination of one register and the upper digit in the proper denomination of another register.

In the present instance these registers comprise armatures and co-operating electro-magnets and after they have been operated to form a preliminary representation of the partial products, the electro-magnets of one register are caused to control those of the other register so as to add the partial products together on the second register; and then the electro-magnets of the second register are caused to control the stop sliders for selecting stops 22 in any columns (other than those in which the multiplier or multiplicand has been entered) for registration of the product.

The specific construction of the calculating magnets and relays will be explicitly described hereinafter.

Setting up the multiplicand

While any number of columns of the data card and consequently of the pins 21 may be utilized for a multiplicand and for a multiplier, for the purpose of this application only two columns are shown as set aside for a multiplicand and two other columns for a multiplier. The two columns of pins 21 used for the multiplier are indicated in Fig. 21m by the characters A and B, A representing the units column of multiplier pins and B the tens column of multiplier pins. In like manner C and D are used to indicate the units and tens column, respectively, of multiplicand pins.

For the purpose of illustration, the example 59×37 equals 2183 above will be used in this specification.

Referring first to the multiplicand register, it will be seen (Figs. 21m, 21n for the units, and Figs. 21j and 21k for the tens) that there is a plurality of rows (in this case two rows for a two digit multiplicand) of electro-magnets 120 each provided with an armature 121, which armatures stand open or away from their magnets when the machine is in normal or cleared condition. Each row or denominational set of magnets 120 consists of nine magnets representing, respectively, the digits 1 to 9, as indicated on the several magnets in Figs. 21m, 21n, 21j, and 21k. All of the magnets 120 are permanently grounded in any desirable manner, for instance by connections 120A leading through a commutator 120B (Fig. 21k) to the negative line 122 (Figs. 21n and 21k).

The motor generator or other source of electric power is indicated at 123, Fig. 21zz and is provided with negative and positive leads 122 and 124.

In Figs. 21m, 21n, 21j, 21k, each of the multiplicand magnets 120 is shown as directly connected to a respective lead 125, and each lead 125 is only in circuit with its pin 21 during a portion of the time that such pin is in raised or effective position. The means for connecting these leads 125 to the pins will now be described.

Each slider 31 associated with the multiplier and multiplicand pins is provided with two parallel contact strips 42 which are insulated from the slides as above described and are bent out at one end to form a somewhat V-shaped throat to contact any raised pin 21 in the respective row. The other ends of the strips 42 have upwardly extending contact fingers 43 which brush on opposite sides of plate 36 connected by lead 38 and through intermediate connections to one or another of the magnets 52, as above set forth. The strips 42 are also formed with downwardly extending fingers 129 (Fig. 21m) which brush on opposite sides of a contact member 130 which consists of nine contact strips 131 secured between plates 132 of insulating material and having the spaces between the strips 131 filled with insulating material. Each contact strip 131 is connected to a respective one of the leads 125 (Figs. 21m, 21j).

It will now be understood that as a slide 31 of one of the multiplicand columns moves inwardly, its contactor finger 129 brushes over the contact strips 131 until its contacts 44 strike a raised or effective pin 21. The contact with the pin closes the circuit through the respective contact strip with which the fingers 129 are then engaged and therefore through the respective multiplicand magnet 120. The multiplicand magnet 120 thus energized attracts its armature 121 thus closing a number of circuits as will be presently set forth.

In order that the operation of the multiplicand magnets may be synchronized with other elements, a commutator 120B (Fig. 21k) is inserted in the ground line 120A, the rotary element of the commutator being preferably operable from the shaft 80, or by any other suitable means. The tuning of this commutator is shown in Fig. 23.

Considering for a moment the purpose of this multiplicand register, it may be stated that broadly its purpose is to close connections of circuits corresponding to the digital value of the respective magnets multiplied by each of the digits "1" to "9". Thus the "1" multiplicand magnet must, when energized, cause the closing of connections in circuits corresponding to the partial products 1, 2, 3, 4, 5, 6, 7, 8, and 9 (as shown in Fig. 21n); while the "2" multiplicand magnet must control circuits corresponding to 2, 4, 6, 8, 10, 12, 14, 16, and 18 as shown in Fig. 21n; etc. In other words each denominational row of multiplicand armatures and magnets includes a possible preliminary representation of all of the products from 1×1 to 9×9, inclusive, or a complete single-digit multiplication table.

Each armature 121 of a multiplicand magnet 120 carries a plurality of contactors 133, and when the magnet 120 is energized it attracts its armature 121 thereby causing the contactors 133 of that armature to engage respective contacts 134. There are, obviously, seventeen of these contactors 133 at each armature 121, as the significant digits of the partial products of a 9×9 table never exceed "8" in the tens of these partial products and the nine significant digits in the units of the same. For the sake of uniformity in manufacture of the armatures and magnets all seventeen contactors 133 and cooperative contacts will be made at each magnet, but certain of these will not be connected to an outlet. The scheme of connections is completely shown in Figs. 21j, 21k, 21m, 21n. Thus in the wiring of the "1" magnet 120 there are only nine active contacts 133 as there are only nine digits in the nine partial products formed by this magnet, whereas in the case of the "9" magnet there are seventeen active contacts 133 as there are seventeen digits in the nine partial products formed by this magnet.

Each contactor 133 is connected by an inlet lead 135 (Figs. 21j, 21k, 21m, 21n) to a contactor 1330 (Fig. 21r) on one or another of a series of nine armatures 1210 of digital relays 1200, all of the contactors 1330 being arranged to be brought into engagement with a single contact 1340 connected by a lead 136 with the positive line 124. The digital value of each relay 1200 is indicated thereon in Fig. 21r.

Each of the active contacts 134 (Figs. 21j, 21k, 21m, 21n) is connected by a respective lead 137 to an outlet lead 138 representing the desired digital value of the partial products. There are seventeen of these outlet leads for each denominational series of multiplicand magnets which have the respective digital values of the possible values of the partial products. These leads 138 comprise two series indicated in Figs. 21j, 21k, 21m, 21n by reference characters E and F, the leads E represent the nine possible lower denominational partial product values while the leads F represent the eight possible higher denominational partial products. There are then seventeen leads 138 for each denomination. The digital values of the leads have been placed at the top of these leads in Figs. 21j, 21m and all are indicated.

Now having considered how the multiplicand is set up in the machine, the introduction of the multiplier will be next considered.

*Introducing the multiplier*

As before stated, the rows A and B of pins 21 determine the multiplier to be introduced. The pins which have been raised are contacted by the strips 42 on their respective sliders 31 thereby connecting the positive side of the motor generator to leads 125A and 125B (Figs. 21j, 21k) through their contacts 131. There is one lead 125A or 125B for each contact 131 of the rows A and B, respectively, as shown fully in Figs. 21j, 21k and for introducing the selected illustrative multiplier 37, i. e., the "3" lead 125B for column B and "7" lead 125A for the column A are utilized.

For the purpose of this description, "normal" or the starting point for a cycle of the machine will be considered to be that position and condition of the several instrumentalities at the instant that a card has been fed into position to be analyzed and before the analyzing pins 21 have been raised. At this "normal" position a magnet 139 (Fig. 21o) has been energized by means to be later described and has moved its armature 140 so as to bring a plurality of series of contactors into engagement with respective contacts. The contactors of one series are indicated by 141 and their coacting contacts 142. By referring to Figs. 21m, 21j, 21k, 21n, 21o it will be seen that the lead 125B from the "3" contact 131 of column B is connected by a lead 143 (Fig. 21k) to the "3" contactor 141 of this series of the contactors on armature 140 and with the armature 140 in "closed" position this "3" contactor is in engagement with a contact 142 connected by a lead 144 (Fig. 21r) with the "3" relay 1200. All of the relays 1200 are grounded to a lead 145 (Fig. 21r) from the negative line 122. Thus this "3" relay 1200 is energized and closes its armature 1210 and thereby renders the leads 135 to such armature "live". Inasmuch as the "5" and "9" multiplicand magnets 120 of the tens and units denominations, respectively, are energized, the leads 135 from the "3" relay 1200 to these armatures pass current to the respective contactors 133, leads 137 and outlet leads 138.

The several outlet leads 138 are connected by leads 146 to respective contactors 1410 (Fig. 21l) on the armature 140 of magnet 139, and as this armature is in "closed" position and contactors 1410 in engagement with contacts 1420 the current passes to leads 147 (Fig. 21o) connected to leads 148 (Fig. 21o) which connect to the upper and lower product registers, which will be later described.

The energizing of magnet 139 at the proper instant in the cycle was effected by a contact strip 149 on a rotating commutator 150 (Fig. 21l) contacting a brush 151. The timing for commutator 150 is shown in Fig. 23, and is driven by shaft 80. Strip 149 is connected by a lead 152 to the positive line 124, the brush 151 is connected by a lead 153 to one side of a relay 154. The other side of relay 154 is grounded to negative lead 122 by a lead 155, (Figs. 21l, 21o, 21n) and when the circuit is closed through this relay, its armature 156 (Fig. 21l) is drawn into "closed" position and lead 157 (Fig. 21o, Fig. 21l) from one side of magnet 139 has its terminal contact 158 (Fig. 21l) engaged by a contactor 159 connected to the positive line 124 thru leads which will be later set forth. The other side of magnet 139 is connected by a lead 160 (Figs. 21o, 21l) to a contactor 161 (Fig. 21i) carried by the armature 162 of a relay 163 (Fig. 21i) which is at this instant closed, for reasons later set forth, so that contactor 161 engages a contact 164 connected to a lead 165 from the negative line 122.

Upon the closing of the armature 140 of magnet 139, this armature is held closed by what is usually known as a holding circuit. The armature 140 carries a holding contactor 166, (Fig. 21o) which when the armature is in "closed" condition, engages a contact 167 thereby closing a circuit through lead 157, magnet 139, contact 167, contactor 166, a lead 169 connected to the contactor 166 and lead 155 (Figs. 21o, 21n) to the negative line 122 (Fig. 21n). Hence when armature 140 is "closed" it is so held by this holding circuit. As before stated the connection of lead 157 to the positive line will be later explained.

By reference to Fig. 21i it will be seen that there are three similar relays, one of which has been described at some length as 163. The other two are indicated at 1630 and 1631. Before starting the machine, relay 163 is energized by closing a switch 170, (Fig. 21i) which switch is however immediately reopened and not again operated as long as the motor-generator 123 is kept running. Relay 163 is held closed by a holding circuit common to its and relays 1630 and 1631 and which will now be described. When relay 163 (Fig. 21i) is energized a contact 171 is engaged by a contactor 172 on the armature 162, contact 171 being connected to one side of relay 163. The other side of the relay is connected to contact 164 which is grounded to lead 165. Contactor 172 is connected to a lead 173 which is connected to the positive lead 124. At each relay 163, 1630, 1631, is a switch 174 operable by the armature of the respective relay so that lead 173 is closed when the armature is in either extreme position but opened during the instant when the armature is passing from one position to the other. Thus the energizing of one of these relays will effect the deenergizing of any other previously energized, for all three are grounded to lead 165 and have similar holding circuit connections to lead 173.

Returning now to the operation of the circuits closed by the armature 140, it will be seen that armature 140 also carries a contactor 175 (Fig. 21l) which, when the armature is in "closed" condition, engages a contact 176 connected by a lead 177 (Figs. 21l, 21t) to the positive side of relay 1630, thereby energizing relay 1630 since contactor 175 is connected by a lead 178 (Fig. 21l) to the positive line 124. The energizing of relay 1630 releases relay 163 but the holding circuit for magnet 139 holds the armature 140 closed until the proper impulses for the "3" multiplier times the multiplicand digits, have been transmitted to the proper leads 148.

When these impulses have been properly registered in the product registers, as will be fully described later on, the holding circuit of magnet 139 is broken beyond contactor 159 by means later set forth, and the armature 140 takes up its "open" condition in which a contactor 179 (Fig. 21l) engages a contact 180 closing the circuit thru a magnet 1390 (Fig. 21o) which is similar to magnet 139 but is used to close a number of circuits for entering the partial products produced by the next lower denominational digit of the multiplier and the digits of the multiplicand. The magnet 1390 is provided with an armature 140A carrying the same number of sets of contactors as the armature 140 of the magnet 139 except that the contactors 141A (Fig. 21o) are connected to leads 125A (Figs. 21o, 21l, 21k, 21j, 21m) from series A of the contacts 131. With this armature closed, the "7" contact 131 of series A, being effective, the "7" relay 1200 is energized (the "3" relay having been de-energized upon release of the armature of magnet 139, as will be readily understood). This causes current to flow along the leads 135 controlled by the "7" relay 1200 (Fig. 21r) and active multiplicand registers, (Figs. 21j, 21k, 21m, 21n) and over the appropriate circuits entering the proper digits in the several product registers by means of the leads 148, the connection from 135 to 148 being similar to those previously described in connection with the entering of the "3" multiplied digit. The product registers and their operation by the means just described will be set forth fully hereinafter.

It will be understood that since the present machine is illustrated as having a capacity of only two digits in the multiplier there have been shown only two armatures 140 and 140A and their magnets 139 and 1390; but if it is desired to have a larger capacity, then there will be one armature 140 for each denomination of the largest multiplier for which the machine will be built; and of course, the necessary contactors and connecting leads. However, this is a mere duplication of what is shown and anyone skilled in the art would readily understand how to increase the capacity of the machine.

*Totaling setting means*

When the impulses for the partial products of all of the digits of the multiplicand multiplied by all of the digits of the multiplier have been registered in the upper and lower digit product registers, it is necessary that the two partial products thus obtained shall be added together to give the product, and inasmuch as the present machine is automatic in this respect, it is necessary that when the impulses from the final digit of the multiplier have caused the required registration in the product registers, as hereinafter set forth, then means shall come into play automatically for accumulating or summing up these partial products. The means for setting up operation of this means will now be described.

When the armature 140A of the magnet 1390 moves to closed position, it draws its contactor 175A (Fig. 21l) into engagement with a respective contact 176A connected by a lead 177O (Figs. 21l, 21t) to one side of the relay 1631. This completes the circuit through the relay 1631 so that said relay immediately draws down its armature and releases the armature of the relay 1630. The armature of 1631 is held down by the holding circuit hereinbefore described. As soon as the impulses from the last digit of the multiplier have been entered into the product registers as hereinafter described the holding circuit for the magnet 1390 is broken by means later described and its armature 140A returns to its open position, in which position it brings its contactor 179A (Fig. 21l) into engagement with respective contact 180A which is connected by a lead 181A to one side of a magnet 182 (Fig. 21l). The other side of this magnet is connected by a lead 183 (Figs. 21l, 21t) to contactor 184 mounted on the armature of relay 1631 adapted to engage a contact 185 connected to the lead 165. The contactor 179A on the armature 140A of magnet 1390 is connected to lead 186 (Fig. 21l) to which the contactor 179 of the armature of magnet 139 is also connected. The circuit thru lead 186 is completed when the impulses of the product registers have finished, as will be later explained and thus the circuit is completed through magnet 182 so as to draw down armature 187. The armature 187 carries a plurality of contacts 188 (three for a machine of this capacity), which are adapted when the magnet is in closed position to engage respective contacts 188C connected to leads 189 passing to the upper-digit product register. There is one of these leads 189 (Figs. 21l, 21i, 21h, 21g and Figs. 21f, 21e, 21d, and Figs. 21c, 21b, 21a) for each denomination of the upper-digit product register and it controls the transferring of the amounts accumulated in each denominational series to the respective denominational series of the lower-digit product register. The actual totaling operation will be presently described.

*The product registers*

Turning now to the product registers, there are two of these which for want of better terms, I call "upper-digit" product register and the "lower-digit" product register, since the former receives all of the higher or tens digits of the partial products, and the other, all of the lower or units digits of the partial products. In Figs. 21a–21l inclusive the "upper-digit" register is shown as comprising three denominational sets of armatures with their magnets and relays and in Figs. 21p to Fig. 21zz inclusive, the lower digit register is shown as comprising four denominational sets of armatures with their magnets and relays. This, of course is illustrating a machine of the 99×99 capacity. If a larger number of orders is required, a sufficient number of sets of magnets and relays will be included to take care of the product.

Each of the two partial product registers includes a plurality of series of electro-magnets, each series being identified with a specific denomination. The "upper-digit" register, has one less series of magnets than the "lower-digit" register, as the "upper-digit" register never receives a digit of the same order as the lowest order of the "lower-digit" register.

Each of the series of magnets and relays in each product register consists of a plurality of digit relays 222b and a plurality of main registering digit magnets 221b. Besides these relays and magnets, each series other than that of highest order in each register, is provided with a "carry" or tens-transfer magnet 221c (Figs. 21d, 21g, 21s, 21v, 21y) (the purpose of which is to effect the actual carrying or transferring of one to the next higher denomination); a "carry" relay 222c (Figs. 21d, 21g, 21s, 21y) (the purpose of which is to set for a carrying operaion); a "no-carry" relay 222d; (Figs. 21f, 21i, 21u, 21x, 21zz) an "add-carry-set" magnet 221e (last mentioned figures) (to render the adding and "carry-set" circuits alternatively effective); a release relay 222f; (last mentioned figures) and a "cut-off-carry" magnet 221f last mentioned figures. The highest denominational order of each register includes only digit relays and magnets 222b and 221b (Figs. 21a, 21b, 21p, 21q) and a "cut-off" magnet 221g (Figs. 21c, 21r) (which performs only one of the functions of magnets 221f of the other denominations).

Since the units or lowest denomination of the "lower-digit" register has the greatest number of connections, and all other denominations are substantially similar, this lowest denomination will be specifically described. All connections for this denomination are indicated in Figs. 21y, 21z, 21zz.

Normally each magnet 221f is maintained energized by a holding circuit comprising a lead 244 (Fig. 21zz) to the negative line 122, and a lead 245 (Fig. 21zz, Fig. 21z, Fig. 21g) which has a connection to a contactor 227 of each of the digit magnet armatures. How the magnets 221f are initially energized will be later explained. The lead 245 has also a double-contact switch 246 at every digit magnet armature, such switch being operable by the armature of the respective magnet, so that this holding circuit is closed when all associated armatures are in either extreme position but is broken while any of these armatures is passing from one position to the other. Lead 245 connects to a lead 247 (Fig. 21z) to positive line 124. A lead 248 (Fig. 21z) also connects to lead 245 and connects to a contactor 227b for each digit relay 222b (Figs. 21y, 21z) and is provided with a switch 246b at each relay 222b and controlled by the armature thereof. All of the relays 222b are grounded on a lead 249 (Figs. 21y, 21z, 21zz) to 122. These connections form the holding circuits for the several digit magnets and relays of each denomination and it will be seen that when any digit relay is energized, the holding circuit for all digit relays of that denomination is momentarily broken thereby releasing any other digit relay previously active, and then the circuit is again closed holding the newly energized relay active, also the energizing of any digit magnet will release any previously energized digit magnet of that denomination as well as magnet 221f of the denomination, and the newly energized digit magnet will be held energized.

As before stated the magnet 221f is normally energized, and at this time the "0" relay 222b and "0" digit magnet 221b are also energized, as will be later explained, and held by their holding circuits. The armature of magnet 221f carries nine contactors 227f (Fig. 21zz) as well as a holding circuit contactor 227, and these nine are connected to leads 148 hereinbefore described.

*Carry or transfer determining*

There are also nine contacts 232 (Fig. 21zz) for the magnet 221f which are respectively connected by leads 251 to contactors 227e on the armature of the "add-carry-set" magnet 221e. These contactors 227e normally (i. e., when the magnet 221e is deenergized) stand in engagement with nine contacts 232e connected to leads 235c, (Figs. 21y, 21z, 21zz) of what I term "carry-determining" circuits. Each lead 235c is connected to a respective contactor 227c for each of the digit magnet armatures of the particular denomination. Thus there is a "carry-determining" lead 235c for each of the nine significant digits; and each lead 235c has a respective contactor 227c on each of the armatures of the digit magnets of that denomination, including the "0" magnet armature.

It will be seen that if any digit line 148 is rendered "live", current will pass to the respective contactor 227f (Fig. 21zz) at magnet 221f, then from the engaged contactor 232 to the respective contactor 227e on the armature of magnet 221e and as this armature is then open, current will be transferred by the respective "carry-determining" lead 235c to all of its contactors 227c (Figs. 21y, 21z). As the armature of the "0" digit magnet 221b is closed at this time, current is conducted to the contactor 227c thereof which is connected with the "live" lead 235c and passed thru the engaged contact 232c to the "no-carry" lead 252 (Figs. 21y, 21z, 21zz). As any digit added to zero gives the digit, there will never be a carry to the next higher order when any order standing at zero has any digit added to it. Consequently, all "carry-determining" contactors 227c of the armature of the zero magnet are adapted to engage with contacts 232c connected to the "no-carry" lead 252. In practice there will be a single "no-carry" contact 232c at each armature as later set forth, but for clearness, separate contacts are shown, and, indeed the device could be so constructed but would be bulky.

When current is passed thru "no-carry" lead 252, it flows thru the "no-carry" relay 222d (Fig. 21zz) grounded to the lead 249. This relay 222d attracts or closes its armature, which has two contactors. One of these indicated at 227s is connected with a lead 253 from the lead 245 of the holding circuit for the digit relays and magnets. The corresponding contact 232s is connected with the positive side of relay 222d so that when the armature of 222d is in closed position, a holding circuit for this relay is formed thru leads 245 and 253 and the associated contactor and contact to the relay and ground 249.

The armature of relay 222d also carries a contactor 227d connected to a lead 254 from the outlet side of the magnet 221e. The contact 232d for this contactor is connected to the negative lead from 222d to the ground lead 249 so that when relay 222d moves its armature to closed position, a circuit is closed through magnet 221e thereby energizing this magnet which draws its armature over until its contactors 227e engage contacts 232b connected to "add" leads or inlets 235. The further operation will be described under a subsequent heading.

Thus far we have seen what happens where no carrying is to take place. Let us now see what takes place in the "carry-determining" when a carry operation is to be effected. Presume that the "1" magnet 221b (Fig. 21z) stands closed and that current is passed thru the "9" lead 148. The current passes to the "9" contactor 227f at magnet 221f, thence thru the respective contact 232 to the respective lead 251, to the respective contactor on the armature of magnet 221e, (Fig. 21zz) thru the respective contact to the "9" carrying-determining lead 235c (Fig. 21z). As the "1" armature is the only digit armature in closed or attracted position, the current passes to a respective contactor 227c of this armature and to the respective carry-determining contact 232c. Inasmuch as one plus nine make ten, a carry must be indicated, and for this purpose this contact 232c connects to a "carry" lead 256. This closes the circuit thru a resistance R to the "carry-set" relay 222c (Fig. 21y) which is also grounded by lead 249. The armature of relay 222c carries two contactors 227k and 227l which engage respective contacts 232k and 232l, the first of which connects by a lead 255 through a resistance R1 to the positive or inlet side of the "carry" magnet 221c, and the other 232l to the "carry-set" relay 222c. The contactors of this armature are respectively connected to leads 257 and 258 (Figs. 21y, 21z, 21zz). Lead 258 passes to a contact 232m (Fig. 21zz) normally in engagement with a contactor 227m on the armature of relay 222f. This armature normally stands open, and in this condition completes the circuit from 258 thru a lead 259 to the "add-carry-set" magnet 221e, so that when the armature of 222c is moved to its attracted or closed position, a circuit is closed which acts as a holding circuit for the relay 222c and also energizes magnet 221e to draw its armature to "add" or closed position.

It will thus be seen that when it is determined that no carry is to take place, relay 222d is energized; and when a carry is to take place, relay 222c is energized; but in either case a circuit is closed thru the "add-carry-set" magnet 221e so as to shift the contactors 227e of its armature into engagement with the contacts 232b of the "add" leads 235.

The passage of current thru any lead 148 effects three operations, which are in order: (1) Carry or transfer determination,—i. e., whether upon adding the digit represented by the live lead 148, a carry must be effected into the next higher denominational order; (2) adding of the digit represented by the live lead 148; and (3) actual carrying to the next higher order if carrying is to occur. The first of these operations has been discussed, and now the second will be set forth.

Adding

The shifting of the armature of the magnet 221e (Fig. 21zz) by the energizing of magnet 221e at the end of the carry-determining operation, brings all of the leads 251 into circuit with their respective "add" leads 235 thru contactors 227e and contacts 232b. Each of these leads 235 is connected to a respective digit contactor 227a (Figs. 21y, 21z) secured to the armature of each digit magnet 221b. There is also provided at each digit magnet 221b a digit contact 232a for each contactor 227a, such contacts being connected to one or another of the digit outlet leads 235a. There are ten of these outlet leads 235a for each denominational order, each assigned to one of the ten digits. The one of these leads 235a to which any digit contact 232a is connected is determined by adding the digit represented by the lead 148 (Fig. 21zz) to the digit represented by the digit magnet armature 221b. Thus, the "1" to "9" contactors 227a at the "0" (Fig. 21z) magnet engage respectively with contacts connected to the "1" to "9" leads 235a; while the "1" to "9" contactors at the "5" magnet (Fig. 21y) engage respectively with contacts connected to the "6", "7", "8", "9", "0", "1", "2", "3", and "4" leads 235a. In the addition of "5" to the digit represented by the "5" magnet, five plus five makes ten, so that a carry is indicated and the zero lead 235a is utilized to effect representation of the zero of the "10". The leads 235a are connected respectively to corresponding digit relays 222b (Figs. 21y, 21z) i. e., "0" lead 235a, to "0" digit relay; "1" lead 235a, to "1" digit relay, etc. Hence when current is conducted to one of the digit leads 235a, the corresponding digit relay 222b is energized, all of the relays 222b being connected to the ground lead 249.

This energizing of the relay 222b causes it to attract its armature which opens the respective switch 246b in the digit relay holding circuit line 248 thereby breaking the circuit thru any relay 222b previously energized, so as to release the armature thereof; and then closes switch 246b so as to render the holding circuit effective on the newly energized relay 222b. Also as the armature closes, it brings two contactors 227b and 227n (Figs. 21y, 21z) carried by it into contact with respective contacts 232x and 232n. This closes a circuit from positive lead 247 thru related contacts to the corresponding digit magnet 221b, all of the digit magnets being grounded by connection to a lead 260 running to line 122. The other connection effected by the closing of the armature completes the holding circuit thru the relay so as to hold its armature in closed or attracted position.

The energizing of the respective digit magnet 221b causes it to attract or close its armature which operates the respective switch 246 to open and close the holding circuit for the digit magnets of that denomination thereby de-energizing any previously energized digit magnet and holding the new digit magnet energized. The breaking of this holding circuit also effects de-energizing of the cut-off carry magnet 221f with results which will be presently described under the heading "carrying."

Carrying

When magnet 221f (Fig. 21zz) was de-energized as just described, it released its armature which then moved all of its contactors so that current is now cut off the leads 251 thereby concluding the adding operation. The live contactor 227f will now move into engagement with a single contact 261 connected to the lead 257 and current is now permitted to pass thru this live contactor 227f on armature of magnet 221f, thru contact 261, lead 257 (Figs. 21zz, 21z, 21y) thru contacts 227k, 232k and lead 255 (Fig. 21y) to the "carry" magnet 221c, this magnet being grounded to lead 260. The energizing of magnet 221c closes or attracts its armature which effects the closing of several circuits. One of the contactors indicated at 1c on this armature engages with a contact 1 connected to the positive side of the magnet 221c, this contactor being itself connected with a lead 262 (Figs. 21y, 21z, Fig. 21zz) to one side of the release relay 222f, (Fig. 21zz) the other side of said relay 222f being connected by a lead 263 to the lead 245 (Figs. 21zz, 21x) of the next higher denomination. The circuit thus formed is a holding circuit for the "carry magnet" 221c. The energizing of release relay 222f (Fig. 21zz) closes its armature thereby breaking the connection between leads 258 and 259 so that magnet 221e is de-energized, releasing its armature to bring its contactors 227e again into circuit with the respective contacts 232e and carry-determining leads 235c.

The armature of "carry" magnet 221c also carries one or more carrying contactors. The number of these contactors is equal to the number of higher denominational orders in the machine. Thus in the lowest order of the "lower-digit" register there are here shown three such contactors, 2c, 3c, and 4c, (Fig. 21y) there being only three higher orders in this machine. If the machine were of a greater capacity then a correspondingly greater number of carry contactors would be provided. All of these carry contactors for one denomination are connected to the positive lead 241 of the denomination. One of these contactors 2c engages a contact 2 connected to a lead 264 which is connected directly to the "1" add lead 235c (Fig. 21v) of the next higher order so that when current passed over this lead 264, one is carried to the next higher order. The other carry contacts 3 and 4 (Fig. 21y) are connected to leads 265 which may be termed "nine's carry" leads as they are connected to contactors 3x and 4x (Fig. 21v) of the "9" digit armature of next higher order so that if this armature is closed contact will be made to conduct current over leads 264x and 265x (Fig. 21v, Fig. 21s) from that order to the next higher. Thus if carrying is performed to a denomination already standing at "9" (i. e., having its "9" digit magnet 221b closed), carrying will be concomitantly performed to the still higher order.

When carrying is performed from one order to the next higher, the unit in being added into the higher order, causes one of the digit magnets 221b of this higher order to operate, thereby breaking the holding circuit at its switch 246. It will be recalled that the relay 222f of the lower order is connected to the higher order holding circuit by lead 263. Consequently breaking of the holding circuit for the higher order releases the armature of relay 222f of the lower order and as lead 262 is also rendered dead, the "carry" magnet of the lower denomination also releases its armature.

*Supplemental circuits*

In addition to the parts of the product registers shown in my said application and described above, there are in the present device, certain additional circuits which will now be explained.

Inasmuch as it is necessary to close all of the cut-off magnets 221f (Figs. 21zz, 21x, 21u, 21i, 21f) and 221g (Figs. 21r, 21c) after each set of impulses caused by one of the multiplier pins has been registered in the product register, means are provided for this purpose.

From the above description, it will be understood that whenever a series of impulses, caused by the entry of a single digit of the multiplier and all digits of the multiplicand has completed its work, all of the carry magnets 221c, carry relays 222c, and no-carry relays 222d are in de-energized position, and I take advantage of this condition to close the circuit through all of the switch magnets 221f and 221g.

It will be noted in Fig. 21f that the lead 247 of the next to the highest denomination of the upper-digit register is connected by a lead 300 to a contactor 301 carried by the armature of the no-carry relay 222d of that denomination. When this relay 222d is de-energized the contactor 301 engages a contact 301c connected to a lead 302 (Figs. 21f, 21e, 21d) which runs to a contact 303 (Fig. 21d). Contact 303 is engaged by a contactor 304 carried by the armature of the carry relay 222c of the same denomination whenever this carry relay is in de-energized condition. Contactor 304 is connected by a lead 305 to a contactor 306 carried by the armature of the carry magnet 221c of the same denomination. The contactor 306 engages a contact 306c connected to a lead 307, when this carry magnet 221c is de-energized. Lead 307 (Figs. 21d, 21g, 21h, 21i) runs to a contactor 301 (Fig. 21i) on the armature of the no-carry relay 222d of the next lower denominational order. The connections through the armatures of the carry magnet 221c (Fig. 21g) this next lower denomination are the same except that in this case, this happens to be the lowest order of the "higher-digit" register and the lead 307 (Figs. 21g, 21j, 21m, 21p, 21s, 21t, 21w) here runs to the contactor 301 of the armature of the no-carry relay 222d (Fig. 21w) of next to the highest denominational order of the "lower-digit" register. The circuit continues in this manner through all of the denominations of the "lower-digit" register and its final lead 307 (Fig. 21y) connects to a line 308 connected to the positive side of all of the magnets 221f (Figs. 21zz, 21x, 21u, 21i, 21f) and 221g, (Figs. 21r, 21c) all of these magnets being grounded to the negative line 122.

It will now be seen that all of the magnets 221f and 221g will be re-energized upon the completing of an accumulating operation ready for the next operation, and that as soon as an accumulating operation starts, this universal circuit will be broken by the closing of one or more of the relays 222d or 222c. Of course, certain of the magnets 221f and 221g may remain closed under influence of their respective holding circuits, this being determined by the computation being performed by the machine.

Another matter which I have heretofore referred to but have as yet not fully explained is the energizing and de-energizing of magnets 139, 139o (Fig. 21o) and 182, (Fig. 21l) one after the other. I make use of the opening and closing of magnets 221f and 221g for this purpose as will now be described.

With magnet 139 energized through action of relay 163 (Fig. 21i) as previously described, we have traced a holding circuit for this magnet 139 from negative line 122 through a lead 155 (Fig. 21o) to contactor 166, contact 167, magnet 139, lead 157 (Figs. 21o, 21l) contact 158 and contactor 159, to a lead 310 (Fig. 21l). Lead 310 runs to a contact 311c engaged by a contactor 311 on the armature 187 when such armature is in open condition. Contactor 311 is connected by a lead 312 to lead 186 (Figs. 21l, 21o, 21r, 21u, 21x, 21zz) which runs to a contact 314 (Fig. 21zz) at the switch magnet 221f of the lowest denominational order of the "lower-digit" register. At this time all of the magnets 221f and 221g are closed as above explained, and a contactor 315 on the armature of the lowest magnet 221f engages contact 314. This contactor 315 is connected by a lead 316 (Figs. 21zz, Fig. 21x) to the contact 314 at the next higher denomination and so through all the armatures of all of the switch magnets 221f and 221g of both registers, the final lead 316 (Fig. 21c) being connected to a lead from the positive line 124.

Through this circuit the armature 140 (Figs. 21o, 21l) of magnet 139 (Fig. 21o) is held down until the first digit of the multiplier enters the machine. When impulses are sent to the partial product registers, one or more of the magnets 221f and 221g will be de-energized and thus the holding circuit for magnet 139 will be broken so that it will release its armature. It will, however, be remembered that when the armature of magnet 139 was moved to closed condition, it had caused energizing of relay 1630 (Fig. 21i) and consequently de-energizing of relay 163.

Upon release of the armature of magnet 139, its contactor 179 (Fig. 21l) engages the correlated contact 180. This contactor 179 is connected to lead 186, and when all of the magnets 221f and 221g are again closed the current flows through the several leads 316, to lead 186 through contactor 179, (Fig. 21l) contact 180, lead 181, (Fig. 21l, 21o) magnet 1390 (Fig. 21o), to a contactor 320 on the armature of relay 1630 (Fig. 21i). Relay 1630 being energized at this time, the contactor 320 is in engagement with a contact connected to the negative lead 165. Thus magnet 1390 is energized and its armature is moved to closed condition whereupon relay 1631 (Fig. 21i) is energized and relay 1630 concomitantly released.

Relay 1390 (Fig. 21o) is held energized by a holding circuit which may be traced from the positive line 124 through the several leads 316, lead 186, (Fig. 21l) contactor 179 on the armature of magnet 139, cooperative contact 180, connected lead 181 (Fig. 21o) magnet 1390, connected lead 168A, respective contact and contactor 167 and 166 of the armature 140A of magnet 1390, lead 155 to negative line 122. When, now the next digit of the multiplier is entered, this holding circuit is broken and the armature of 1390 returns to open condition.

When all of the magnets 221f and 221g are again in closed condition, current is passed from line 124, through leads 316, lead 186, the contactor 179A of the armature 140A of magnet 1390, (Fig. 21l) the respective contact 180A, connected lead 181A, magnet 182, lead 183 (Figs. 21l, 21i) contactor 184, (Fig. 21i) contact 185 and lead 165 to line 122. This causes energizing of magnet 182 (Fig. 21l) and moves contactor 311 to break its circuit. With this armature 187 closed, current passes from line 124 to a lead 321 which has a branch connected to a contactor 322 which is at this time engaged with a contact connected by a lead 323 (Figs. 21l, 21i) to the lead 1700 (Fig. 21i) leading to the relay 163. Relay 163 is thus energized and relay 1631 is concomitantly de-energized.

Magnet 182 (Fig. 21l) is held energized by a holding circuit which may be traced from the line 124 through leads 316, lead 186, contact elements 179A and 180A at magnet 1390, respective lead 181A, magnet 182, respective lead 168, connected contact, cooperative contactor on armature 187 and lead 324 (Figs. 21l, 21o) to lead 155 and line 122. As soon as any magnet 221f or 221g is opened, this holding circuit is broken and the magnet 182, opens, leaving relay 163 closed.

The relay 154 (Fig. 21l) has been described as closed by operation of commutator 149, 150. Once this relay is energized it is so held until magnet 182 is closed. This is done by a holding circuit which may be traced from line 124, through lead 321 one branch of which carries current to a contactor 325 on armature 187 (Fig. 21l) and which engages a contact when armature 187 is open so as to pass current over a lead 326 to a contactor 327 on armature 156. When armature 187 is closed contactor 327 engages a contact connected to the same side of relay 154 as lead 153, the circuit being completed through the relay 154, lead 324 and lead 155 to line 122. This holding circuit is broken whenever magnet 182 is energized as its armature moves contactor 325 out of circuit, whereby re-energizing of magnet 139 is prevented during the totaling operation which will now be explained.

*Totaling*

It has already been described how the magnet 182 is energized after all partial products have been registered in the "upper-digit" and "lower-digit" product registers; and also how the energizing of magnet 182 closes circuits thru all of the leads 189. It will be remembered that there is one lead 189 for each denomination of the upper digit register, each lead 189 running to its respective denomination. It will also be remembered that "totaling" as herein used means the adding of the amount registered in the "upper-digit" product register to that registered in the "lower-digit" register so as to produce the complete product in the "lower-digit" register.

There is one lead 189 for each denominational order of the "upper-digit" register (in this instance three); and these denominational leads 189 are connected, respectively, to respective contactors 189b on the armatures of the significant digit magnets (see Figs. 21g, 21h, for example). Each of these digital contactors 189b has a corresponding contact 189c connected by a lead 273 with the respective lead 148 of the corresponding denomination in the "lower-digit" register.

In the illustrative problem which we have been dealing with the partial product in the "upper-digit" register is 156,—i. e., the "1", "5", and "6" armatures in the thousands, hundreds, and tens denominational orders stand closed. (There is no units denominational order in this register.) Consequently, when the leads 189 are rendered live, the current passes through the respective contactors and contacts at the "1", "5" and "6" magnets of the respective denominations, and thence over the corresponding leads 273 to the corresponding digit leads 148 of the respective denominations of the "lower-digit" register. This current passing over the "lower-digit" register leads causes the adding in of the respective digits precisely the same as if the current had been caused to flow over these leads by the introduction of partial products as hereinbefore set forth. Thus the partial products are added together to form the complete product 2183.

*Clearing*

It is necessary that before any digit be entered in the machine, all of the registers be cleared. When no multiplicand pin 21 is active, the multiplicand magnets will all be de-energized as they do not have any holding circuits and depend entirely upon the pins to complete energizing circuits. But the product registers have holding circuits and here it is necessary to energize the "0" relays and magnets. For this purpose, I provide a series of brushes 330 (Fig. 21l) which are arranged to touch the strip 149 simultaneously with each other. These brushes 330 are connected to respective leads 331 which run to respective "0" relays 222b which relays are grounded to line 122, so that as brushes 330 wipe on strip 149 all "0" relays 222b are closed which results in releasing any previously set relays 222b; and the closing of the armatures of the "0" relays 222b effects the energizing of all of the "0" magnets 221b as has been fully set forth. In this manner the machine is cleared or reset to zero.

Setting up the product (Figs. 11 and 12)

While it takes a long time to trace out the circuits which perform the calculation, the electrical connections work with great speed and the product is obtained during the part of the cycle indicated in Fig. 23 by the timing designated "Multiplication". Since it is the purpose of the present device to set up the product in the tabulator stops during the same cycle as the multiplicand and the multiplier, means are provided whereby the digit magnets of the "lower-digit" product-register may control setting up of the product after the complete product has been entered in the "lower-digit" product register. This means will now be described.

It will be seen from Figs. 11 and 12 that when the armatures of the "lower-digit" product registers are closed so as to indicate the product, these armatures will have raised respective pins or stops 204 carried thereby into the path of movement of correlated stop shoulders or projections 203. These stop shoulders or projections 203 are arranged on a slide 200 and by contacting with the pins 204 determine the excursion of the slides 200 occurring during a part of the cycle shown in Fig. 23 and in accordance with the raised pins 204. In other words, the slides 200 are movable under control of the pins 204 to positions indicating the products standing on the "lower-digit" product registers. In the present application I have shown them as controlling certain rows of tabulator stops 22 assigned to product registering so as to effect entry of the product into the tabulator head. In this connection, see Figs. 1, 11, and 12, of the present application.

Mounted on the magnet housings 223 of the "lower-digit" register are nipples 350 to which are secured the ends of the outer casings or sheaths of Bowden wires 351. The inner wire of each Bowden wire is connected at one end to a respective one of the slides 200 as indicated at 352. The other end of each Bowden wire is secured to a respective slide member 353 similar to the slide members 91 by which the multiplier and multiplicand digits have been temporarily set up, but not having the teeth 93 in their lower edges since these slide members are not stopped by electro-magnetically operable stops directly operable from the card. Springs 354 tend constantly to drive the slides 353 in one direction, but the slides are held back by a bar 355 which is universal to all of the slides 353. This universal bar 355 is suitably supported in the machine frame so as to slide horizontally and is secured at its ends by links 356 to the upper ends of a pair of rock arms 357 rotatably supported on the cross-shaft 75. A link 358 pivotally secured at one end to one of the rock-arms 357 has its other end secured to an eccentric strap 359 which embraces an eccentric 360 mounted on and rotatable with the shaft 80. The other ends of the sheaths of the Bowden wires are supported in nipples 361 carried by the cross bar member 86. The action of the eccentric 360 is so timed as to give a proper interval for the completion of the calculation before the rod 355 is moved to permit the springs 354 to move the sliders 353. As the bar 355 moves toward the right in Fig. 11 the slides will follow to the extent permitted by the raised pins 204, and in case no pin 204 has been raised in a column the slider 353 will be permitted to move so far that its stop raising finger 119 will be entirely out of the range of any of the tabulator stops 105. After all of the sliders 91 and 353 have been moved to their proper positions the universal cross-bar 86 is raised as already described, at a time in the cycle shown in Fig. 23 so as to raise the desired stops 22 of the known tabulator mechanism. Upon the completion of the cycle of operation, the sliders 91 and 353 are returned to normal position by the bars 65 and 355.

Zeros in the multiplier

So far there has been described the mechanism and mode of operation where the multiplier is of the full number of digits which the machine is designed to permit, and where each digit of the multiplier is a significant digit. But there would occur computations where the multiplier might be of a less number of digits than the multiplier capacity of the machine, or where zeros might occur in the multiplier. For instance in the machine as shown (which has a multiplier capacity of only two digits), we might have 7 as a multiplier or we might have 30 as a multiplier. In the first instance it would be necessary to de-energize the magnet 139 automatically although no products are passed to the product registers, and in the second case it would be necessary to de-energize magnet 1390 although no products are passed to the product registers while this magnet would be active. To take care of such contingencies, I provide as follows:

In preparing cards or perforated records for use with the present device, it is necessary to have a perforation in each column of the multiplier zone. Consequently in each column where no significant digit occurs, there must be a perforation in the "0" position, so that in each such column a zero pin 21 will be interposed in the path of the respective slider 31 and will contact with the contactor 44 thereof.

While not heretofore mentioned, each contact member 130 for the multiplier zone carries a tenth contact strip indicated at 1310 in Fig. 1 and Fig. 21m which is connected by a lead 1250 (Fig. 21j) and by leads 125A and 125B (Figs. 21j, 21k, 21l, 21n, 21o) to a contactor 1660 or 1660A on the respective armature 140 or 140A (Fig. 21o). Cooperative with each contactor 1660 and 1660A is a respective contact 1670 or 1670A, contacts 1670 and 1670A being connected by leads 375 and 375A (Fig. 21o) to a lead 376 (Figs. 21o, 21r) which passes to one side of a relay 377 (Fig. 21r), the other side of this relay being grounded by a lead 378 running to the lead 145.

The armature 379 of relay 377 (Fig. 21n) is normally held away from the relay by a spring 380 and carries a contactor 381 engaged with a contact 382 when the relay is de-energized. Contact 382 and contactor 381 are connected in the line 186 and when the relay 377 is energized through a "0" multiplier pin becoming active, the armature 379 is moved to separate contactor 381 from contact 382 thereby causing a gap in line 186 and de-energizing of magnet 139 or 139a as the case may be, and the consequent readjustment to render the next order multiplier pin of the totaling mechanism effective.

Magnet and relay construction (Figs. 13 to 20)

From the wiring diagrams, the connections appear very complex and impractical of embodiment in a machine of reasonable size. However, I have devised a simple way of combining a large number of contacts, contactors and leads in a small space as shown, described and claimed in said application Ser. No. 302,453. This description will now be presented.

As already described, this machine includes a number of magnets and relays. These magnets and relays are, for the most part divided into groups, each group comprising a plurality of series each series being assigned to a respective denomination of its group or register. Means are provided for supporting each denominational series of magnets and relays as a unit.

As shown in Figs. 18 and 19, the magnets are indicated generally by the numeral 521 and the relays 522. Specific reference characters have been given the several magnets and relays when their specific functions were discussed. The magnets and relays of any one series or denomination are all secured in a housing member or trough 223 of inverted U-shaped formation, the magnets and relays being secured against the upper inner surface of the member 223. The lower portion of member 223 is bridged by plates 224 to which are secured plates 225. Between the pair of plates 224 and 225 for each magnet is secured a plurality of strips 526 some of which have spring contactor fingers 527 extending upwardly and over plate 224 and supporting the respective armature 528 which armature consists of two plates. The construction and arrangement of these strips 226 will be presently described in detail. It will now be clear that each housing 223 with its plates 224 and 225 forms a unitary structure for supporting a denominational series of magnets and relays; with their armatures and connections and that the entire denominational set of magnets may be assembled as a unit and then introduced into the machine. The units may be supported in any desired manner on base plate 26.

It may be well at this point to digress for an instant to state that the slides 200 hereinbefore mentioned are secured on top of the housings 223 of the "lower-digit" magnets and the pins 204 are guided in holes in these housings and in strips 231 Figs. 1 and 11 carried by the numeral magnets of this tier. The pins 204 are secured to or rest upon respective armatures 528, by which they are raised into the path of fingers 203.

Each of the magnets 521 and relays 522 is adapted when energized to cause a plurality of contactors to move into engagement with respective contacts, and as a relatively large number of contactors may be operated by certain of said magnets and relays, there has been devised a very simple and compact construction for the contacts and contactors. The number of contactors operated by the several magnets and relays varies according to the number of circuits over which each must exert a controlling influence. The construction and arrangement of contacts and contactors for typical magnets and relays will be specifically described it being understood that all are similarly constructed, differing only in the number and arrangement of parts.

Referring particularly to Figs. 13 to 20, it will be seen that for each magnet 521 and relay 522 there is provided a plurality of strips 526. There are four types of these strips and all strips are formed with tongues or fingers. The fingers for the contactors are all indicated by the numeral 527 which fingers as already stated are bent upwardly and inwardly so as to resiliently support the armature 528 of the respective magnet or relay and these spring contactors 527 extend beyond the armatures so as to be brought into engagement with respective contacts when necessary. Certain of the strips 526 are formed with contact fingers 532 which are bent upwardly at the side of the pile of strips 526 opposed to that at which the contactor fingers 527 are bent up. The upper ends of fingers 532 are bent inwardly to form contacts to be engaged by respective contactors. Certain of the strips 526, Fig. 15, are formed with a plurality of contacts 532 so as to be engageable by a plurality of contactors; but these are used only in the multiplicand register. The other form of strips 526, Fig. 14, comprises what I term the "carry" and "no-carry" strips and are respectively formed with fingers 533 and 534. These fingers 533 and 534 vary in width for the several digit magnets, so as to engage from one to nine contactors according to the digital value of the magnet.

The strips 526 are insulated from each other either by a coating of insulating material or by a sheet of insulating material attached to the surface. In Fig. 13 the blanks for the contactors 527 and for those contacts formed by fingers 532 are shown. It will be seen that the contactor fingers 527 and 532 are arranged at spaced intervals on their strips 526 so that a number of the fingers may be bent up in the same vertical plane without interfering with each other. By reference to Figs. 16 and 18 it will be seen that I bend all of the contactors 527 of one magnet up in two vertical planes and then bend them in, in parallel relation to support the armature 528. The contacts 532 are also bent up in two planes and then inwardly to position for engagement with respective contactors 527; and the contacts 533 and 534, Fig. 14, which are always complemental, are bent up in a single plane, which is one of the planes of contacts 532, and into position for engagement by the respective contactors 527. The portions of contactors 527 and contacts 532, 533 and 534 which are adapted to engage for controlling circuits, have the insulating material removed. The screws with which the plate 225 and all of the strips 526 for a magnet or relay are held in place are of insulating material.

In order to readily assemble the strips 526, they are formed with apertures 526a and each of the plates 224 is provided with depending pins 524a of insulating material upon which the plates 526 may be readily and quickly assembled. This construction is best shown in Figs. 13, 14, 15, 18, 19 and 20.

Inlet and outlet connecting bars 535 and 535a are arranged between the ends of strips 526 of each denomination and the insulation of such strips as should be interrelated is removed so as to permit current to flow through said bars 535 and 535a either to or from all of the strips 526 with which each bar 535 or 535a is connected. Thus all of the "0" strips 526 of a denomination are connected in parallel series by a bar 535; all of the "1" strips of a denomination by another bar 535, etc. The purpose of this will be apparent from the description of leads 235 and 235c hereinbefore.

Applications of the invention

While the invention has been shown as applied to a tabulator by way of example, it is obvious that the same is readily applicable to use with a perforating machine for concomitant punching of the multiplicand, multiplier and product, or to any form of registering or of recording machine.

Furthermore, while I have described what I consider to be the most desirable embodiment of my invention, it is obvious that many changes could be made without departing from the spirit of my invention, and I, therefore, do not limit myself to the exact construction shown nor to anything less than the whole of my invention as hereinbefore described, and as hereinafter claimed.

I claim:

1. In a cyclically operable multiplying machine, the combination with means for setting up a representation of two factors for a multiplying operation, of devices settable for receiving and representing said factors and other settable recording control devices for controlling recording of said factors, means under control of said setting means for concomitantly setting the aforesaid receiving and representing devices and the aforesaid recording control devices in accordance with said factors, result representing means comprising a plurality of orders of digit representing electro-magnets representing digits by the closed positions of their related armatures, multiplying means controlled by said receiving and representing devices for effecting the computation and devices associated with said multiplying means for causing said electro-magnets to represent by the closed positions of the armatures the result of the multiplication, supplemental settable recording control devices settable in accordance with the closed positions of the armatures for controlling the recording of the result, and means for causing successive operation of said multiplying means, of the devices associated therewith, and the setting of said supplemental recording control devices in the same cycle of operation as the setting up of the first named means.

2. In a cyclically operable machine, the combination with means for simultaneously setting up a representation of a multiplicand and multiplier, of settable multiplier and multiplicand receiving and representing means set up under control of said setting means, settable multiplicand and multiplier recording controlling devices, means under control of said setting means for concomitantly setting up in the same cycle of machine operation the multiplier and multiplicand representing means and said recording controlling devices, an upper digit register and a lower digit register each of which comprises digit representing magnets and armatures, means controlled by said representing and receiving means for selecting and for entering the tens and units partial products in the respective registers to cause said magnets and armatures of the respective registers to represent the tens and units partial products, means controlled by the armatures of one of said registers for entering in said other register the partial product entered therein to cause the armatures of said other register to represent the final product, and supplemental settable product recording controlling devices automatically settable under control of the armatures of said other register in accordance with the armatures representing the digits of the final product and settable in the same cycle of machine operation as the first named representing means and the first named recording controlling devices are set up.

3. A machine according to claim 2 wherein the means for receiving and representing a multiplier and multiplicand comprise plural denominational series of magnets, and wherein the means for simultaneously setting up a representation of a multiplier and a multiplicand in said denominational series of magnets comprises a plurality of series of digit representing contacts a plurality of movable contacts one for each series, a plurality of series of stop means settable in response to perforations in a record, and means for effecting differential positioning of the movable contactors under control of said stop means.

4. In a cyclically operable multiplying machine of the character set forth having multiplicand entry receiving means comprising a plurality of series of magnets and contact operating armatures operated thereby, multiplier digit receiving means comprising a series of magnets and contact operating armatures operated thereby, means settable to represent a multiplicand and a multi-digit multiplier, an upper digit partial product register and a lower digit partial product register each comprising a plurality of series of electromagnets and contact operating armatures operated thereby to represent partial products by the operative condition of the armatures, means controlled by said settable means to cause the multiplicand entry receiving means to represent by the operative positions of its armatures a complete multiplicand, means controlled by said settable means to cause the multiplier entry receiving means to represent by the operative positions of its armatures successive digits of the multiplier digit by digit, and means controlled by the multiplicand representing armatures and the multiplier digit representing armatures for entering partial products in said upper and lower digit registers for each multipler digit.

5. In a cyclically operable machine of the character set forth having a cyclically operable operating means, multiplier and multiplicand receiving devices, settable multiplicand and multiplier means for simultaneously representing a multiplicand and multiplier, means operated by said operating means at the beginning of a cycle of operation for causing the settable means to be set and for entering the multiplier and multiplicand in the respective receiving devices under control of said settable means, a pair of registers each of which comprises a plurality of series of relays representing digits by operative positions of the armatures thereof, multiplying means controlled by the multiplier and multiplicand receiving devices for selecting and entering the units and tens partial products in said registers, transfer means operable upon completion of partial product entries in said registers for transferring the partial product entered in one register to the other register for accumulating therein the final product, settable product recording controlling means, and means controlled by said operating means for causing said other register representing the product to control the setting of said product recording controlling means after the final product has been accumulated in said other register.

6. In a cyclically operable machine, the combination of a plurality of denominational rows of movable elements, settable selectors one for each denominational row of movable elements, means for controlling the positioning of certain of said selectors and settable in one machine cycle for representing a plurality of factors relating to a multiplying computation, a plurality of registers each of which comprises a plurality of series of relays representing digits by operative condition of the armatures thereof, multiplicand and multiplier receiving devices controlled by said first means, multiplying means controlled by the multiplicand and multiplier receiving devices for selecting and entering the unit and tens partial products in said registers, transfer means controlled by one of said registers for transferring the partial product therein to the other register for representing therein the final product, and means controlled by the digit representing armatures of said other register for controlling the positioning of other of said selectors to operate related rows of said movable elements according to the product, and means for effecting the positioning of all of the selectors in the same cycle of operation.

7. In a machine of the character set forth, the combination of multiplier and multiplicand set up devices a plurality of denominational multiplicand receiving devices, a plurality of multiplier digit receiving devices, means controlled by certain of said set up devices for rendering said multiplicand receiving devices effective to simultaneously receive the entire multiplicand and means for causing said multiplier digit receiving devices to receive successive digits of the multiplier digit by digit under control of other of said set up devices, a plurality of partial product registers each of which includes a plurality of denominational series of digit relays and digit magnets, each series having its digit magnets controllable by corresponding digit relays of such series, partial product entry means under control of said multiplier and multiplicand receiving means for energizing said relays and through said relays the related digit magnets to represent the units and tens partial products in said registers, a common holding circuit for all of the digit relays of a series, and a common holding circuit for all of the digit magnets of a series.

8. In a machine of the character set forth, the combination of multiplier and multiplicand set up devices, a plurality of denominational multiplicand receiving devices, a plurality of multiplier digit receiving devices, means controlled by certain of said set up devices for rendering said multiplicand receiving devices effective to simultaneously receive the entire multiplicand and means for causing said multiplier digit receiving devices to receive successive digits of the multiplier digit by digit under control of other of said set up devices, a plurality of partial product registers each of which includes a plurality of denominational series of digit relays, a plurality of corresponding denominational series of digit magnets and a cut-off magnet for each series each series having its digit magnets controllable by corresponding digit relays of such series, and by the cut-off magnet of such series, partial product entering means under control of said multiplier and multiplicand receiving means for energizing said relays and the related digit magnets to represent thereby the units and tens partial products, a common holding circuit for all of the digit relays of a series, and a common holding circuit for all of the digit magnets of a series and for the cut-off magnet of that series.

9. In a cyclically operable machine of the class described, the combination of record controlled devices settable to receive and represent factors of a multiplying computation, an upper digit register and a lower digit register each of which comprises digit representing magnets and armatures, multiplying means controlled by said representing and receiving devices for selecting and for entering the tens and units partial products in respective ones of said registers to cause said magnets and armatures of the respective registers to represent the tens and units partial products, means controlled by the armatures of one of said registers representing a partial product for transferring to said other register the partial product entered therein to cause the armatures of said other register to represent the final product, devices settable under control of said final result representing armatures to control the recording of the final product, a cyclically operable operating means, and means operated by said operating means for sequentially setting up said record controlled devices and said last named settable devices in a single cycle of operation of the operating means.

10. In a machine of the character set forth, the combination of multiplier and multiplicand set up devices, a plurality of denominational multiplicand receiving devices, a plurality of multiplier digit receiving devices, means for rendering said multiplicand receiving devices effective to simultaneously receive the entire multiplicand, means for causing said multiplier digit receiving devices to receive successive digits of the multiplier digit by digit under control of other of said set up devices, and partial product registering means including a plurality of denominational series of registering magnets and associated armatures operable under control of said multiplicand receiving devices and multiplier receiving devices, said means for registering the partial products and effecting summation of the same including a holding circuit for each series of said plurality of series of registering magnets, and means controlled by the armature of each magnet upon becoming effective to open the holding circuit of its series.

11. In a device of the character set forth, the combination of product registers for separately accumulating the right and left hand components of partial products each including a denominational series of registering magnets and means controlled by each magnet of a series upon becoming effective for rendering ineffective any previously effective magnet of the same series, multiplicand magnets, multiplier controlling magnets, a total transfer magnet and means controlled thereby for effecting transfer of totals from one of said product registers to another of said product registers, and automatic means for rendering said multiplier and totalizing magnets effective seriatim.

12. In a device of the character set forth, the combination of product registers for separately accumulating the right and left hand components of partial products, each including a denominational series of registering magnets and means controlled by each magnet of a series upon becoming effective for rendering ineffective any previously effective magnet of the same series, multiplicand magnets, multiplier controlling magnets, a total transfer magnet, and means controlled thereby for effecting transfer of totals from one of said product registers to another of said product registers, means for rendering said multiplier and totalizing magnets effective seriatim, and means for automatically setting up a preliminary representation of the product under control of one of said product registers.

13. In a cyclically operable multiplying machine, the combination of means settable for representing a plurality of factors for a multiplying operation, means for effecting the setting of said means at the beginning of a cycle of machine operation to simultaneously represent said factors, devices settable for receiving said factors to control multiplication, and other settable devices for controlling the recording of said factors, means operable under control of said settable means for setting both of the aforesaid settable devices after said settable means are set up to represent factors, an upper digit register and a lower digit register, multiplying means controlled by said factor receiving devices for entering tens and units partial products in respective registers, transfer means controlled by one of said registers for transferring the partial product therein to the other register containing the other partial product for summation in said other register of said partial products to represent the final product in said other register, supplemental settable recording control devices settable in accordance with the product on said other register for controlling the recording of the product, a cyclically operable operating means, and means operable by said operating means for causing the successive operation of the multiplying means, the transfer means and the setting of said supplemental control devices in the same cycle of operation as the operation of said first named means.

ROBERT E. PARIS.